(12) United States Patent
Robarge

(10) Patent No.: US 7,496,999 B2
(45) Date of Patent: Mar. 3, 2009

(54) VALVE NUT REMOVAL AND REPLACEMENT SYSTEM

(76) Inventor: Randall P. Robarge, 2867 141st Ave., NW., Andover, MN (US) 55304

( * ) Notice: Subject to any disclaimer, the term of this patent is extended or adjusted under 35 U.S.C. 154(b) by 58 days.

(21) Appl. No.: 11/784,369

(22) Filed: Apr. 5, 2007

(65) Prior Publication Data

US 2008/0222867 A1 Sep. 18, 2008

Related U.S. Application Data

(60) Provisional application No. 60/809,768, filed on May 31, 2006.

(51) Int. Cl.
B23P 19/04 (2006.01)
(52) U.S. Cl. .............. 29/265; 29/255; 29/261; 29/278
(58) Field of Classification Search ........... 29/265, 29/255, 261, 267, 270, 278, 262
See application file for complete search history.

(56) References Cited

U.S. PATENT DOCUMENTS

| | | | | |
|---|---|---|---|---|
| 2,503,426 A | * | 4/1950 | Tower | 29/283 |
| 4,031,603 A | * | 6/1977 | Shultz | 29/426.6 |
| 4,077,103 A | * | 3/1978 | Kelley | 29/259 |
| 5,301,924 A | * | 4/1994 | Kammerer | 254/131 |
| 5,419,027 A | * | 5/1995 | McPeak et al. | 29/252 |
| 5,896,639 A | * | 4/1999 | Chen | 29/261 |
| 6,474,285 B2 | * | 11/2002 | Phillips | 123/193.5 |
| 6,665,919 B1 | * | 12/2003 | Kurtz et al. | 29/262 |
| 6,698,048 B1 | * | 3/2004 | Greene | 7/158 |
| 6,925,696 B1 | * | 8/2005 | Williams | 29/252 |

\* cited by examiner

*Primary Examiner*—Lee D Wilson
(74) *Attorney, Agent, or Firm*—Hugh D. Jaeger, Esq.

(57) ABSTRACT

A valve nut removal and replacement system including a plurality of associated tools and methods used for above ground access to, replacement of, and maintenance of worn, misshaped, abused or otherwise faulty valve nuts located at a subsurface location. A system is provided including tool components, many of which can be configured for multiple uses. The system provides for the cleaning and removal of a retainer nut, for the removal of a damaged valve nut, and for the installation and securing of a new valve nut from a remote above ground location.

19 Claims, 18 Drawing Sheets

VALVE NUT REMOVAL AND REPLACEMENT SYSTEM

CROSS REFERENCES TO RELATED APPLICATIONS

This application claims benefit from the earlier filed U.S. Provisional Application No. 60/809,768 entitled "Adjustable Actuating Lock-on Wrench with Nut Puller" filed May 31, 2006, and is hereby incorporated into this application by reference as if fully set forth herein.

BACKGROUND OF THE INVENTION

1. Field of the Invention

The present invention relates to water distribution systems, and more particularly, relates to above ground servicing of underground water distribution valve nuts which have deteriorated or which have been damaged beyond suitable use. A system having multiple and configurable tool devices is used to remove and replace such water valve nuts.

2. Description of the Prior Art

Various wrench systems and nut removal tools and nut puller devices have existed and been used for some time. Wrench systems and nut removal tools are shown, for example, in the following United States of America patents:

U.S. Pat. No. 7,118,091. Tool for controlling water supply (Price. Oct. 10, 2006). A tool for shutting off water supplies; however, this tool is not designed for other environments and applications, such as sanitary sewer valves or replacing a rounded valve stem nut. Also, a shim may be needed for adjustment.

U.S. Pat. No. 7,000,897. Apparatus and method for operating a water valve (Chick. Feb. 21, 2006). Uses a spring-loaded button to engage and hold an inner shaft to an outer shaft, which provides less than optimal size adjustment capability. Designed for water valve applications only.

U.S. Pat. No. 6,928,906. Large self-forming socket (Marks. Aug. 16, 2005). Requires a collar with shelf around the center pin to protect the bias spring from over-compression.

U.S. Pat. No. 6,802,337. Valve can extension (Phipps. Oct. 12, 2004). This invention relates to an underground access conduit for the adaptation or extension of the access conduit to grade level. Also, this invention is designed for use on a curb stop accessed through a conduit (known as a valve can, valve box, or curb box), which makes this invention less than universal.

U.S. Pat. No. 6,776,068. Valve operator (Reuschel, et al. Aug. 17, 2004). This invention requires a motor and a torque converter for power, making it less cost efficient and more cumbersome to operate.

U.S. Pat. No. 6,349,622. Multipurpose valve opening tool (Lemaire, et al. Feb. 26, 2002). A compact tool designed to grip a number of different size valve stems, but not a rounded valve stem nut.

SUMMARY OF THE INVENTION

The general purpose of the present invention is to provide a valve nut removal and replacement system which will repair or maintain a sanitary sewer valve, a fire hydrant supply valve, or water main systems from above ground, thereby eliminating the need to excavate at the site. The invention includes configurable components having one or more associated subcomponents located at one or more ends of different sufficiently long shafts or tubes. The use of such components facilitates delivery of the subcomponents or other features of the invention to the underground site of and for interfacing with water control valve nuts and associated components. The components of the present invention can be arranged and utilized in different combinations and sequences as each step involved in use of the invention dictates. Major components, structures or assemblies of the present invention include, but are not limited to, a valve nut puller tool, an accessory tool shaft for use with a plurality of accessory tool attachments, such as brushes or other attachable devices, a removably attachable T-handle which can be secured to and used in conjunction with the valve nut puller tool and also with the accessory tool shaft and associated plurality of accessory tool attachments, a valve nut replacement tool, a valve nut supply plate which can include configured replacement valve nuts or other suitably sized and configured valve nuts, and a stem matching plate used for determining the size and/or shape of a valve nut center cavity. Various components can be assembled for use as a cleaning device where one of a plurality of attachments, such as a rotary brush, can be used with the accessory tool shaft and removably attachable T-handle to clean debris, dirt or other foreign objects to suitably expose a retainer nut or retainer bolt which secures a damaged water valve nut to a valve stem. Another combination of components, such as the accessory tool shaft and a nut socket tool, can be arranged to rotatably remove a retainer nut or retainer bolt from the valve stem of the underground valve. Other components can be assembled including the valve nut puller tool having a configurable fixture at one end and the removably attachable T-handle at the other end combined to forcibly extract a damaged water valve nut from a valve stem of an underground valve. The valve nut puller tool is used to extend along and through a valve box to contact, grasp and extract the damaged valve nut. The nut replacement tool is used to position a suitable replacement valve nut on a bared underground valve stem.

According to one embodiment of the present invention, there is provided a valve nut removal and replacement system for use in the removal of and replacement of an underground damaged valve nut without removing the underground valve from the earth.

One significant aspect and feature of the present invention is a valve nut removal and replacement system which is operated remotely from above ground.

Another significant aspect and feature of the present invention is the use thereof as a cleaning device which has removably attached cleaning brushes, thread cleaners as well as other attachments which may be utilized for other than cleaning, including a tap and a die, each of which may be operated remotely above ground to the underground site of a valve.

Still another significant aspect and feature of the present invention is the use of a nut socket tool in conjunction with an accessory tool shaft for remote removal of a retainer nut on an underground valve stem.

Yet another significant aspect and feature of the present invention is the use of a valve nut puller tool, the components of which can be configured and utilized for multiple uses.

A further significant aspect and feature of the present invention is the use of a fixture at the end of the valve nut puller tool which can be configured and used as a guide for the cleaning tool and associated components thereof.

A further significant aspect and feature of the present invention is the use of a fixture at the end of the valve nut puller tool which can be configured and used as a guide for the accessory shaft when in use with accessory tool attachments and associated components thereof.

A further significant aspect and feature of the present invention is the use of a fixture at the end of the valve nut puller tool which can be configured and used remotely and forcibly to remove a damaged valve nut in various stages of disrepair from the valve stem of an underground valve.

A still further significant aspect and feature of the present invention is the use of a threaded actuator shaft interacting with a cam to pivotally position opposed levered arms for entry into a valve box for facilitating the entry of a valve nut into a receptor cavity.

A still further significant aspect and feature of the present invention is the use of a threaded actuator shaft interacting with a cam to position opposed levered arms for grasping and forcibly removing a remotely located valve nut from a remotely located valve stem.

A still further significant aspect and feature of the present invention is the use of a valve nut replacement tool to deliver and install a replacement valve nut upon a remotely located valve stem on a remotely located valve.

A still further significant aspect and feature of the present invention is the use of a valve nut supply plate and a stem matching plate to readily and easily determine and supply a suitably sized replacement valve nut.

A still further significant aspect and feature of the present invention is the use of interface devices which protect threaded surfaces of threaded components of the invention.

Having thus briefly described embodiments of the present invention and having mentioned some significant aspects and features of the present invention, it is the principal object of the present invention to provide a valve nut removal and replacement system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
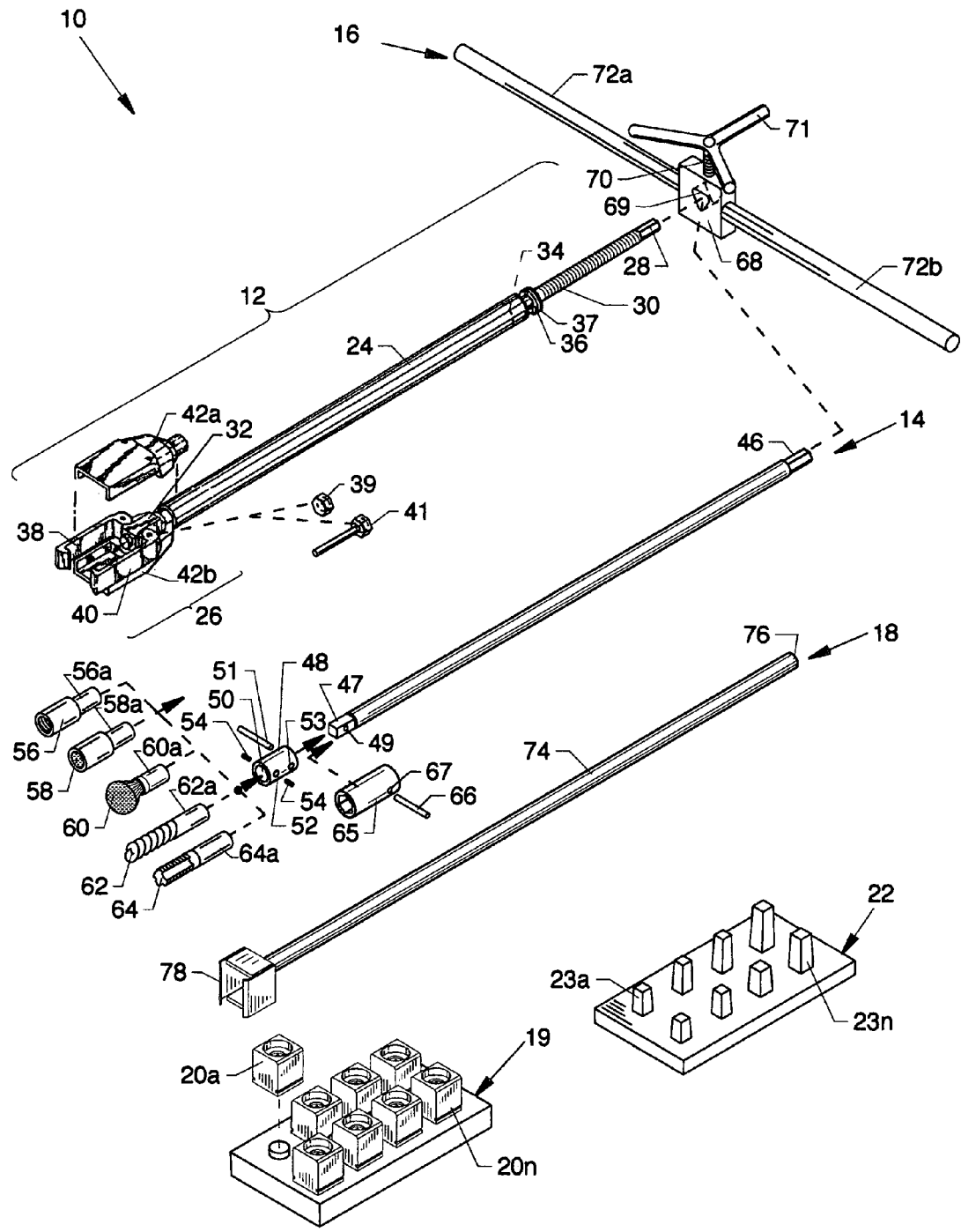
FIG. 1 is an isometric view of a valve nut removal and replacement system of the present invention.

FIG. 1 is an isometric view of a valve nut removal and replacement system 10 of the present invention including, but not limited to, a valve nut puller tool 12, an accessory tool shaft 14, a removably attachable T-handle 16, a valve nut replacement tool 18, a valve nut supply plate 19 having posts upon which various size and style replacement valve nuts 20a-20n, which preferably are stainless steel, can be stored, and a stem matching plate 22 having various size numbered stems 23a-23n extending vertically therefrom. Components of the valve nut puller tool 12 include an elongated tube 24, an end structure 26 having variable geometry aligned and secured to one end of the tube 24, a hex head 28 at one end of a threaded actuator shaft 30, whereby the threaded actuator shaft 30 extends along the interior of the tube 24 to threadingly engage and operate a cam 32 in the end structure 26, a top shouldered bushing 34 (best seen in FIGS. 2 and 8) including a bevel 33 (FIG. 8) located at the lower portion of the bushing passage aligned and secured within the upper end of the elongated tube 24 for guidance of the upper region of the threaded actuator shaft 30 or for guidance of other components, a washer 36 and nut 37 (FIGS. 1 and 2), the latter of which threadingly engages the upper region of the threaded actuator shaft 30, and opposed levered arms 38 and 40 pivotally mounted in the end structure 26 interacting with a cam 32 for angular positioning of opposed levered arms 38 and 40. For the purpose of illustration, brevity and clarity, a one-piece housing 42, which is a component of the end structure 26, is shown divided in section form as housing halves 42a and 42b where the housing half 42a is shown distanced from the opposite housing half 42b where the latter is shown in fixed engagement with one end of the elongated tube 24. An interface/thread protector 39 and an extended interface/thread protector 41 are included for attachment at the lower end of the threaded actuator shaft 30 for use thereupon depending on the style of the damaged valve nut which is to be removed and are used as an interface and to prevent damage to the end of the threaded actuator shaft 30 and to the external or internal threads of a valve stem associated with a particular style of valve nut. Additional components of the end structure 26 in association with other components and features of the invention are shown in detail in FIGS. 2 and 3, as well as in other figures.

Figure 8:
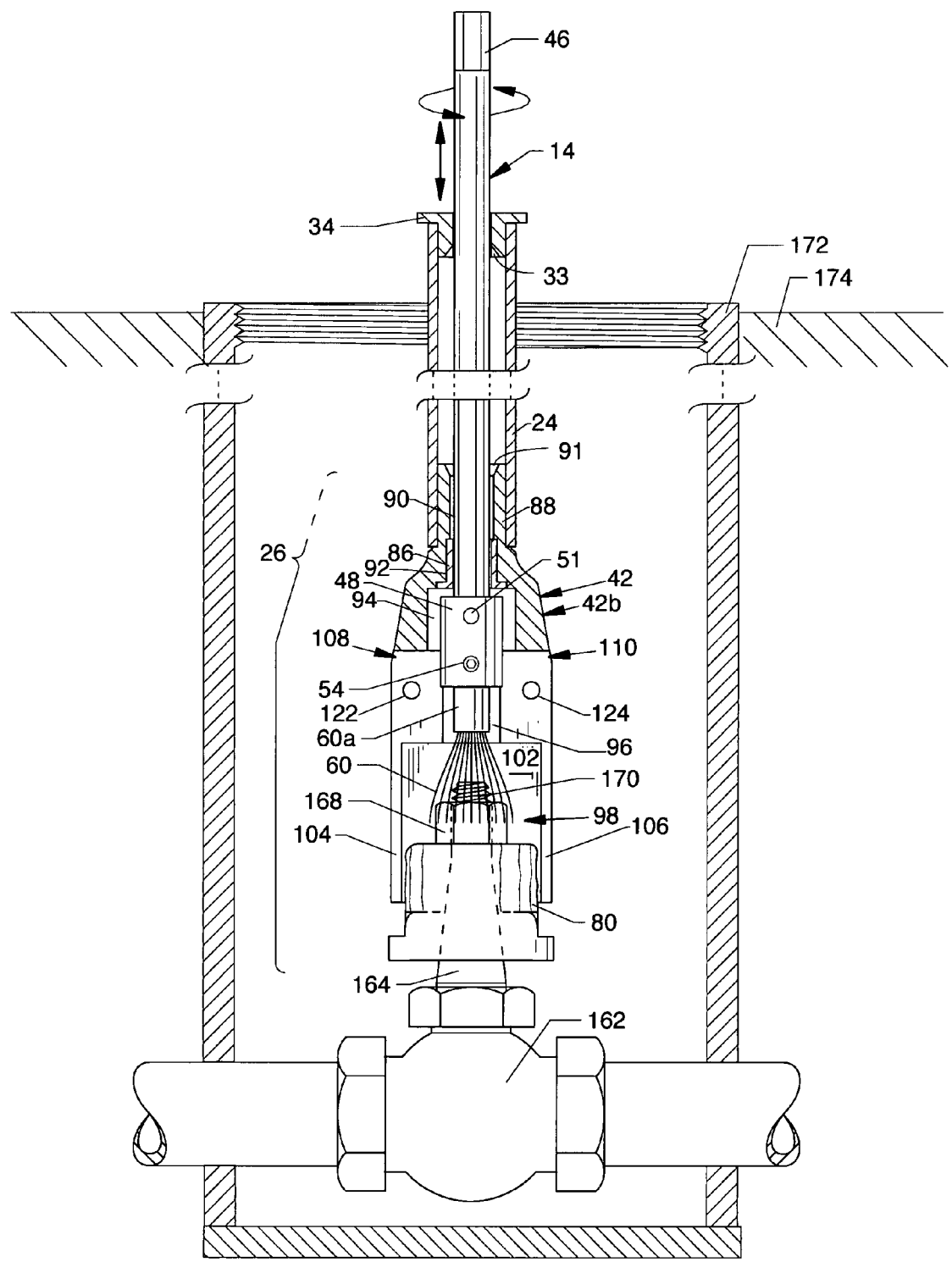
FIG. 8 shows the cleaning process incorporating components of the invention to clean the area around and about a retainer nut prior to using a socket tool and nut socket.
Figure 9:
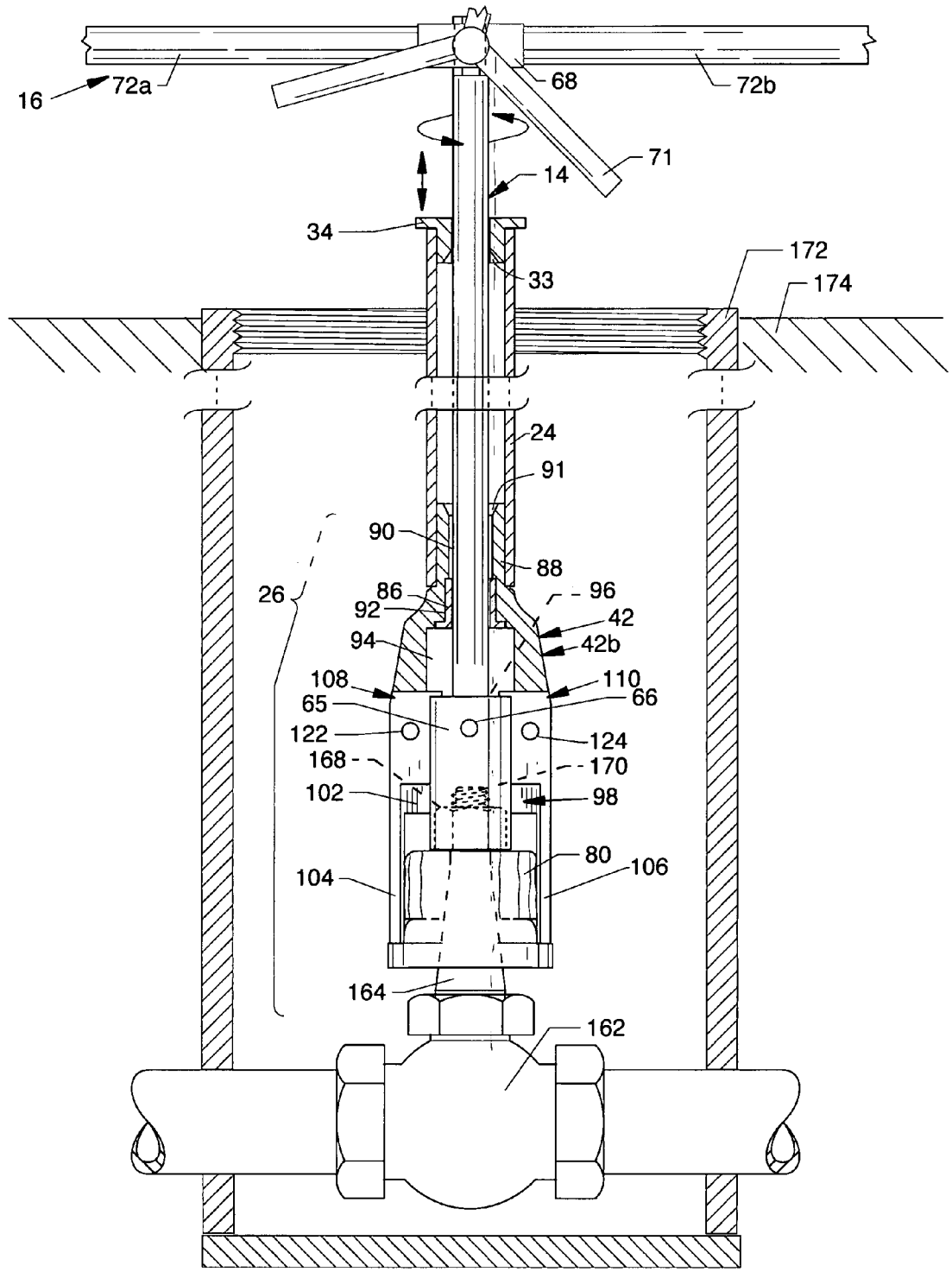
FIG. 9 illustrates the use of a socket tool to remove a retainer nut from a valve stem in order to allow subsequent removal of a damaged valve nut.

The accessory tool shaft 14 also shown in FIGS. 1, 8 and 9 is preferably and generally round having one end configured as a hex head 46 or other suitable configuration for connection and communication with the removably attachable T-handle 16 or with an electric drill or other rotational device in order to rotate the accessory tool shaft 14 and appropriate attachment tool later described in detail. The opposite end of the accessory tool shaft 14 includes a square drive connector 47 having a body hole 49 extending therethrough. The square drive connector 47 can accommodate a tool receptor 48 having a bore 50, whereby the tool receptor 48 can be secured to the square drive connector 47, such as by the use of a pin 51 extending through opposed holes 53 (one shown) of the tool receptor 48 and through the body hole 49 in the square drive connector 47. A plurality of opposed threaded mounting holes 52 (one shown) near the lower end of the tool receptor 48 are used for fixing a variety of accessory tool attachment devices within the bore 50 of the tool receptor 48. Set screws 54 extend through the threaded mounting holes 52 to secure the selected accessory tool attachment to the tool receptor 48. The variety of useful accessory tool attachments can include, but are not limited to, a thread cleaner die 56, a rotary brush 58 having internal inwardly extending bristles, a rotary brush 60 having outwardly and downwardly extending bristles, a tap drill 62 and a tap 64 each of which includes shafts 56a, 58a, 60a, 62a and 64a, respectively. The square drive connector 47 can also accommodate a nut socket tool 65 of appropriate features and desired size by the use of a pin 66 extending through opposed holes 67 (one shown) in the nut socket tool 65 and through the body hole 49 of the square drive connector 47.

The removably attachable handle 16 shown in FIG. 1 can be brought into rotary action use by connecting it to the hex head 28 of the valve nut puller tool 12 or to the hex head 46 of the accessory tool shaft 14. The removably attachable handle 16 includes a body 68, a triangular shaped mating hole 69 in the body 68 which hole can suitably accommodate the hex heads 28 and 46 of the valve nut puller tool 12 and accessory tool shaft 14, respectively, where each hex head 28 or 46 can be secured therein by using a threaded locking shaft 70 which threadingly engages the body 68 and which is operated by a three bar handle 71. Actuating bars 72a and 72b are secured to and extend from the body 68 for applying rotary motion to the valve nut puller tool 12 or accessory tool shaft 14.

The valve nut replacement tool 18 shown in FIG. 1 includes a robust tube 74 with a striking surface 76 at one end which is suitable for repeated forceful blows thereupon by a mallet or hammer. A nut receptacle socket 78, being substantially a square and open structure having an open end, is located at the opposite end of the tube 74 for loading one of the valve replacement nuts 20a-20n.

Figure 2:
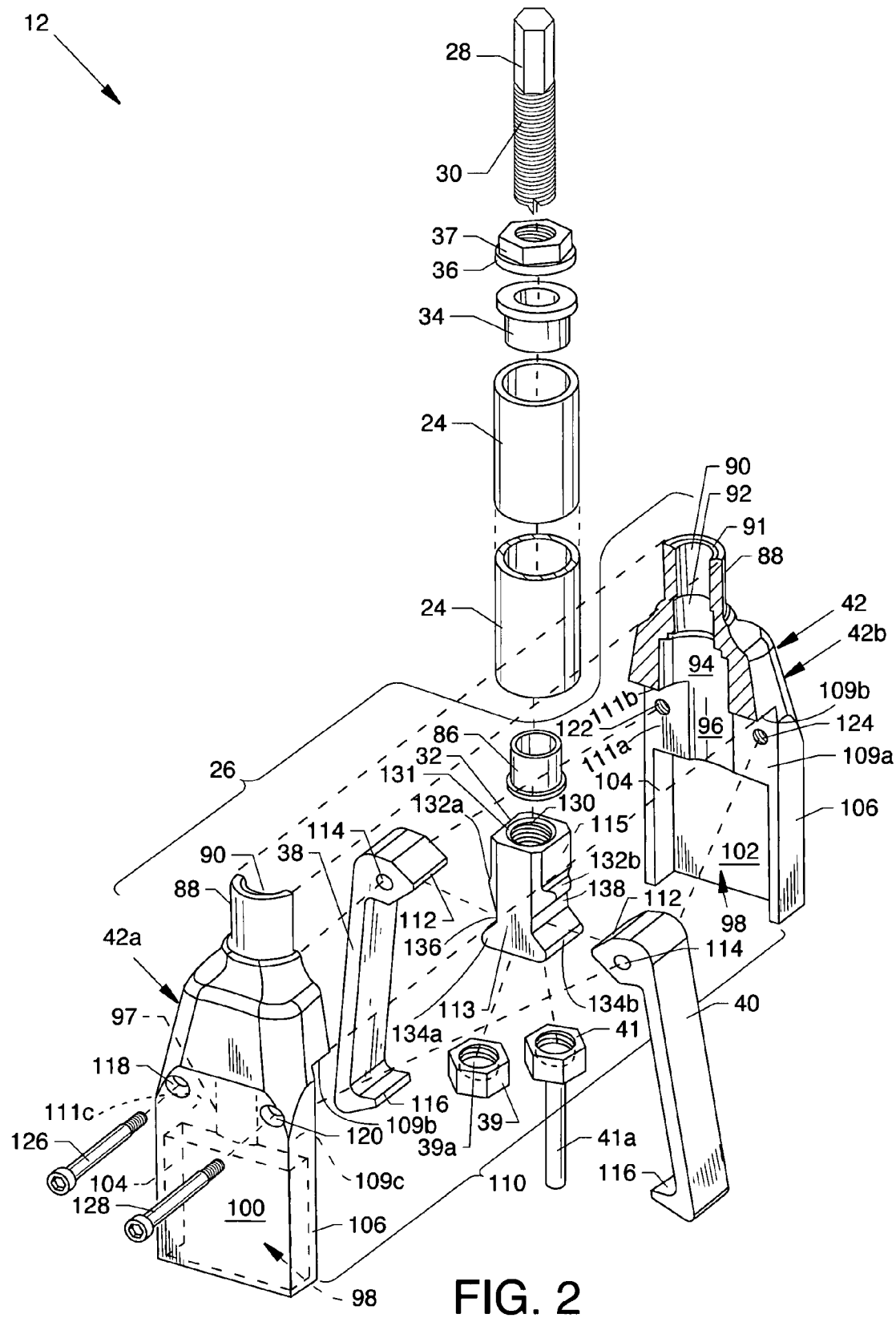
FIG. 2 is an exploded view of a valve nut puller tool of the system shown in FIG. 1.
Figure 3:
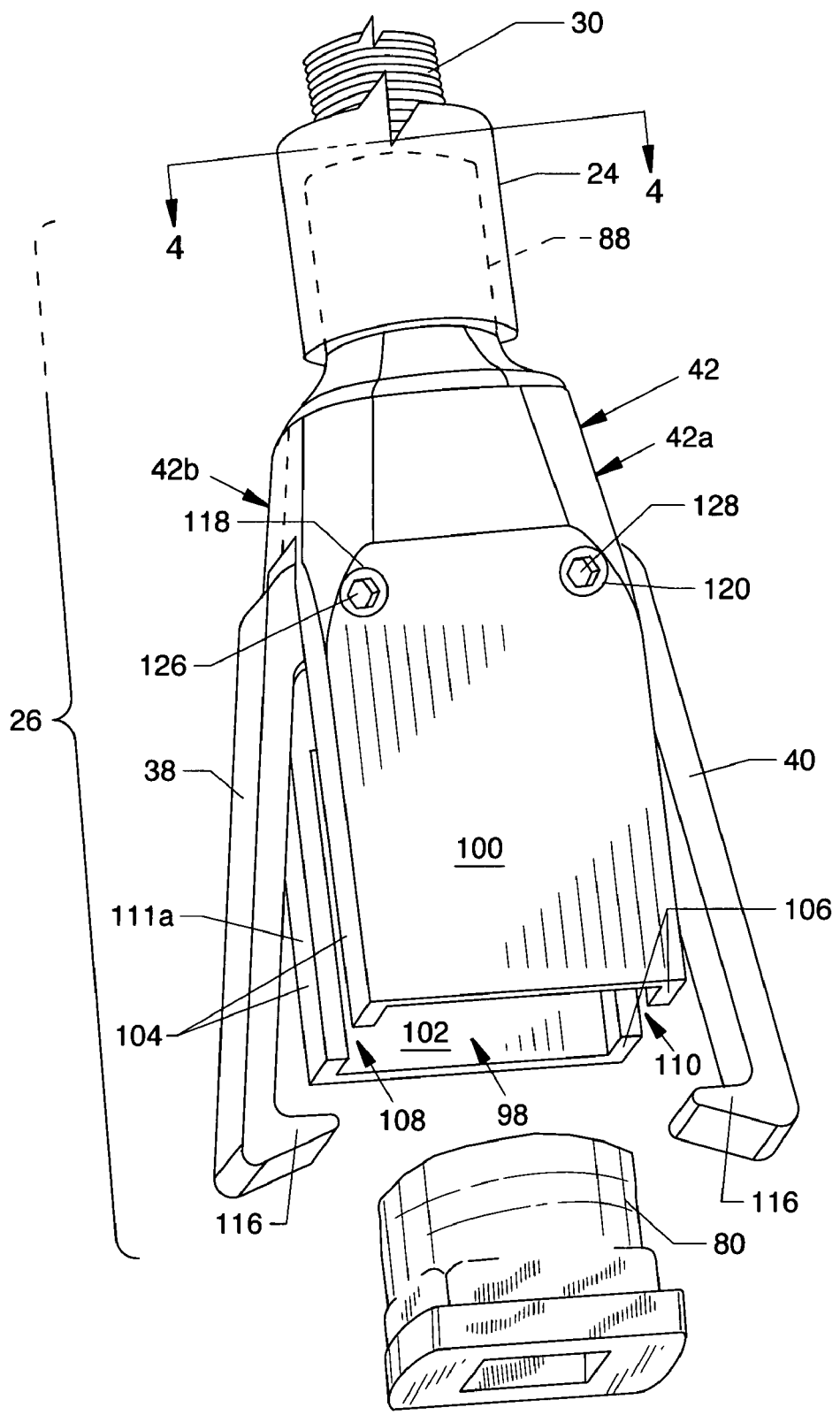
FIG. 3 is a view of the assembled end structure of the valve nut puller tool aligned with a damaged valve nut.

FIG. 2 is an exploded view of the end structure 26 of the valve nut puller tool 12, as well as other previously described components of the valve nut puller tool 12. FIG. 3 is a view of the assembled end structure 26 aligned with a representative damaged valve nut 80. With reference to FIG. 2 and FIG. 3, the present invention is further described. As previously described, the housing 42 is shown as a housing half 42a and as a housing half 42b for purposes of illustration and clarity, although the housing 42 is a unitary structure. The housing 42 is described referring to the housing half 42a with the understanding that various features or structures are common to both housing halves 42a and 42b, except as noted. Continuously connected and adjacent round cavities, passageways, collars or partial arcuate cavities included at the upper portion of the housing 42 are utilized to accommodate tubular or round components of the valve nut puller 12 which connect thereto or which are located therein, including a bottom shouldered bushing 86, the lower end of the tube 24 and the lower end of the threaded actuator shaft 30. A collar 88 of tubular shape at the upper portion of the housing 42 accommodates the interior bottom end of the tube 24 which is suitably secured thereto. The interior of the collar 88 defines a passageway 90, preferably being round, for the accommodation of a bottom portion of the threaded actuator shaft 30. A bevel 91 at the top end of the collar 88 assists in the alignment and entry of the lower end of the threaded actuator shaft 30 with the collar 88 and other components. A bushing cavity 92 conforming to the general shape of the bottom shouldered bushing 86 is continuous with and extends downwardly from the passageway 90 for accommodation of the bottom shouldered bushing 86 which is frictionally engaged therein. The bottom shouldered bushing 86 guidingly accommodates the lower portion of the threaded actuator shaft 30 or of other devices, such as the accessory tool shaft 14. A tool accommodation cavity 94, preferable being round, is continuous with and extends downwardly from the lower region of the bushing cavity 92 for accommodation of tools such as, but not limited to, the nut socket tool 65 or the tool receptor 48 which can be used with the accessory tool shaft 14 and associated for cleaning or other associated functions. The tool accommodation cavity 94 also accommodates the upper portion of the cam 32, as later shown in FIG. 4. In different modes of operation, the threaded actuator shaft 30 or the accessory tool shaft 14 can pass directly or indirectly or align within one or more of the following components including the tube 24, the collar 88, the passageway 90, the bottom shouldered bushing 86, the bushing cavity 92, the tool accommodation cavity 94 and the lower region of the housing 42. An arcuate tool accommodation space 96 shown at the mid-portion of the housing half 42b and an opposing mirror image like arcuate tool accommodation space 97 similar to the arcuate tool accommodation space 96 extend downwardly from the tool accommodation cavity 94 at the mid-portion of the housing 42.

The lower portions of the housing 42 form a valve nut receptor cavity 98 having a square profile for alignment with and accommodation of a damaged valve nut 80, as seen in FIG. 3, or in rare occurrences, one of the replacement valve nuts 20a-20n. The valve nut receptor cavity 98 is formed of opposed front and back planar walls 100 and 102 and opposed interrupted left and right planar walls 104 and 106 extending downwardly to form the lower portion of the housing 42 (i.e., housing halves 42a and 42b) where opposed vertically oriented slots 108 and 110 (FIG. 3) are included in the interrupted left and right planar walls 104 and 106, respectively, to accommodate movement of the levered arm 38 and the levered arm 40. The slot 110 is delineated by a vertically aligned planar surface 109a, a horizontally aligned surface 109b, and a vertically aligned surface 109c. The slot 108 is delineated by a vertically aligned planar surface 111a, a horizontally aligned surface 111b, and a vertically aligned surface 111c. The levered arm 38 and the levered arm 40 are similar wherein each arm includes a follower cam 112, a pivot hole 114 extending through the follower cam 112, and an inwardly extending jaw 116 whereby the jaws 116 are utilized to intimately engage a damaged valve nut 80, such as described later in detail. Horizontally aligned body holes 118 and 120 extend through the mid-body region of the housing 42 (housing half 42a) in alignment with oppositely aligned threaded holes 122 and 124 of the mid-body region of the housing 42

(housing half 42b). Pivot bolts 126 and 128 preferably having Allen heads extend through the body holes 118 and 120, through the pivot holes 114 of the levered arms 38 and 40, respectively, and are secured in the threaded holes 122 and 124 to thereby pivotally and removably attach the levered arms 38 and 40 to the housing 42. The levered arms 38 and 40 can be pivotally actuated by the cam 32 to operate about the pivot bolts 126 and 128, whereby the levered arms 38 and 40 align within and are accommodatingly positioned in and along the slots 108 and 110. The cam 32, which includes an interior threaded hole 130 and a bevel 131 at the top of the threaded hole 130, aligns between the arcuate accommodation spaces 96 and 97 of the housing 42 and also aligns within the tool accommodation cavity 94 to be vertically positioned therealong by engagement with and by rotary action of the threaded actuator shaft 30 which is turned by the removably attachable T-handle 16. The bevel 131 assists in alignment and entry of the lower end of the threaded actuator shaft 30 with the threaded hole 130. The cam 32 includes opposing top lobes 132a and 132b, opposing bottom lobes 134a and 134b, a non-lobe flat surface 136 between the top lobe 132a and the bottom lobe 134a and are opposite non-lobe flat surface 138 between the top lobe 132b and the bottom lobe 134b where appropriate features thereof interact with the follower cam 112 of the levered arm 38 and the levered arm 40, respectively, to angularly position the levered arm 38 and the levered arm 40 about the pivot bolts 126 and 128, respectively. The cam 32 also includes vertically oriented opposed flat surfaces 113 and 115 extending substantially between the edges of the top lobes 132a and 132b, the edges of the bottom lobes 134a and 134b and between the edges of the non-lobe flat surfaces 136 and 138. Also shown in FIG. 2 are the interface/thread protector 39 and the extended interface/thread protector 41 which are threadingly engaged and affixed to the bottom of the threaded actuator shaft 30 and which interface with various styles of valve stems. The interface/thread protector 39 has internal threads and includes a contact plate 39a at the lower region for contacting the top of a valve stem and the extended interface/thread protector 41 has internal threads and includes a contact shaft 41a for contacting a valve stem having an internally threaded hole, as shown later in detail.

Figure 4:
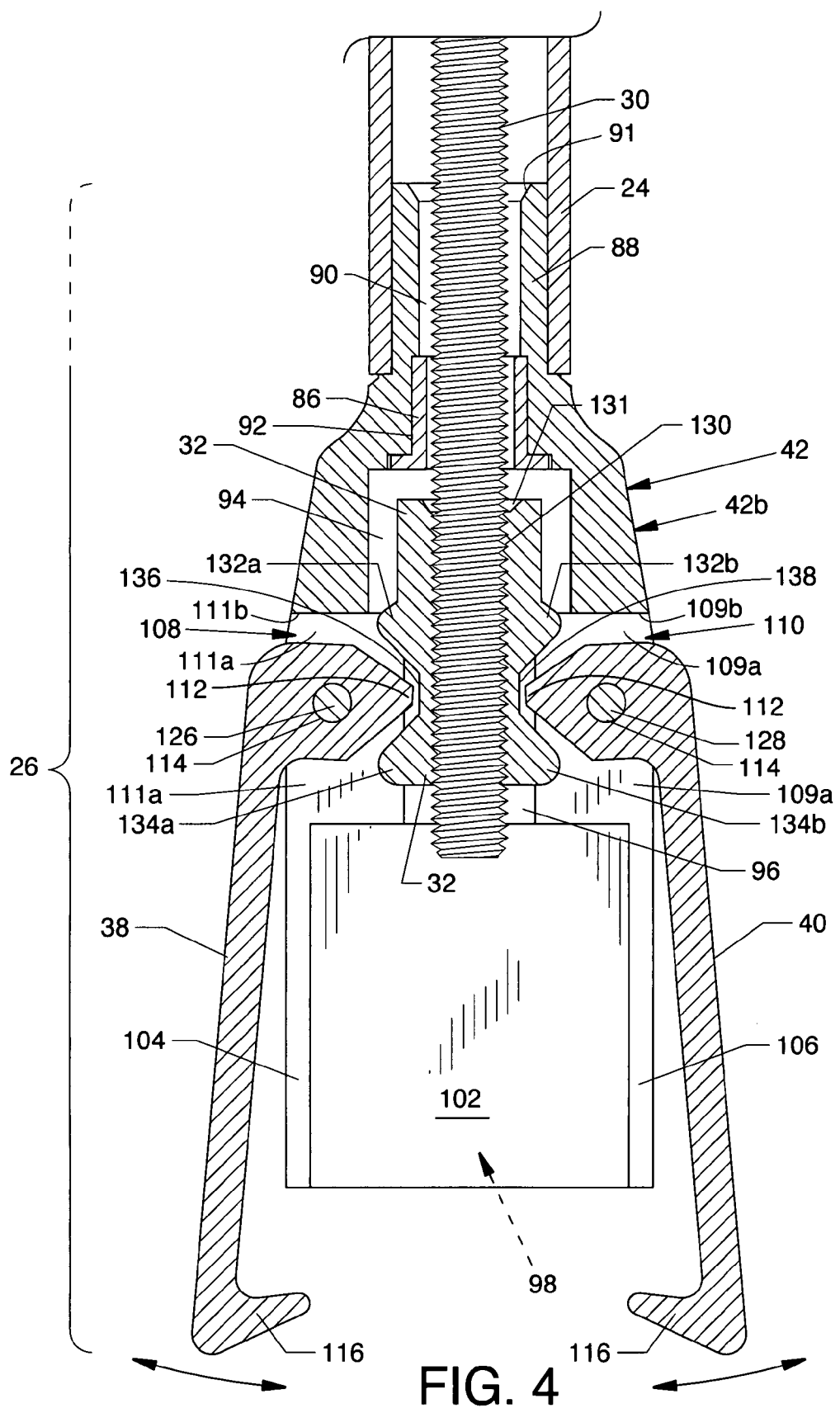
FIG. 4 is a cross section view along line 4-4 of FIG. 3 showing the relationship of the end structure to a connecting tube and threaded actuator shaft.

FIG. 4 is a cross section view along line 4-4 of FIG. 3 showing the relationship of the end structure 26 to the elongated tube 24 and the threaded actuator shaft 30. Shown in particular is the relationship of the cam 32 with the levered arms 38 and 40. The follower cams 112 of the opposed levered arms 38 and 40 are shown in alignment to the non-lobe flat surfaces 136 and 138, respectively, of the cam 32 without contact with but in near proximity to the top lobes 132a and 132b and the bottom lobes 134a and 134b of the cam 32. The threaded actuator shaft 30 is shown extending directly through the elongated tube 24, the passageway 90 of the collar 88, the center of the bottom shouldered bushing 86, the tool accommodation cavity 94, and in threaded engagement with and extending slightly beyond the threaded hole 130 of the cam 32. The threaded actuator shaft 30 also extends indirectly through the bushing cavity 92. Attachment of and rotation of the removably attachable T-handle 16 (FIG. 1) to the hex head 28 at one end of the threaded actuator shaft 30 provides for the rotation of the threaded actuator shaft 30 to position the centrally located cam 32 upwardly or downwardly along the vertical axis of the end structure 26. The cam 32 is precluded from rotation about the vertical axis of the fixture 26 by the close relationship of a portion of the flat surface 115 (FIG. 2) of the cam 32 against the upper region of the planar surfaces 109a and 111a and a portion of the flat surface 113 of the cam 32 against the upper region defined by the planar surfaces 109c and 111c of the housing 42. The cam 32 interacts with the follower cams 112 of the levered arms 38 and 40 to pivotally position the levered arms 38 and 40 inwardly or outwardly about the pivot bolts 126 and 128, respectively, whereby the levered arms 38 and 40 are utilized in various modes of operation.

Figure 5:
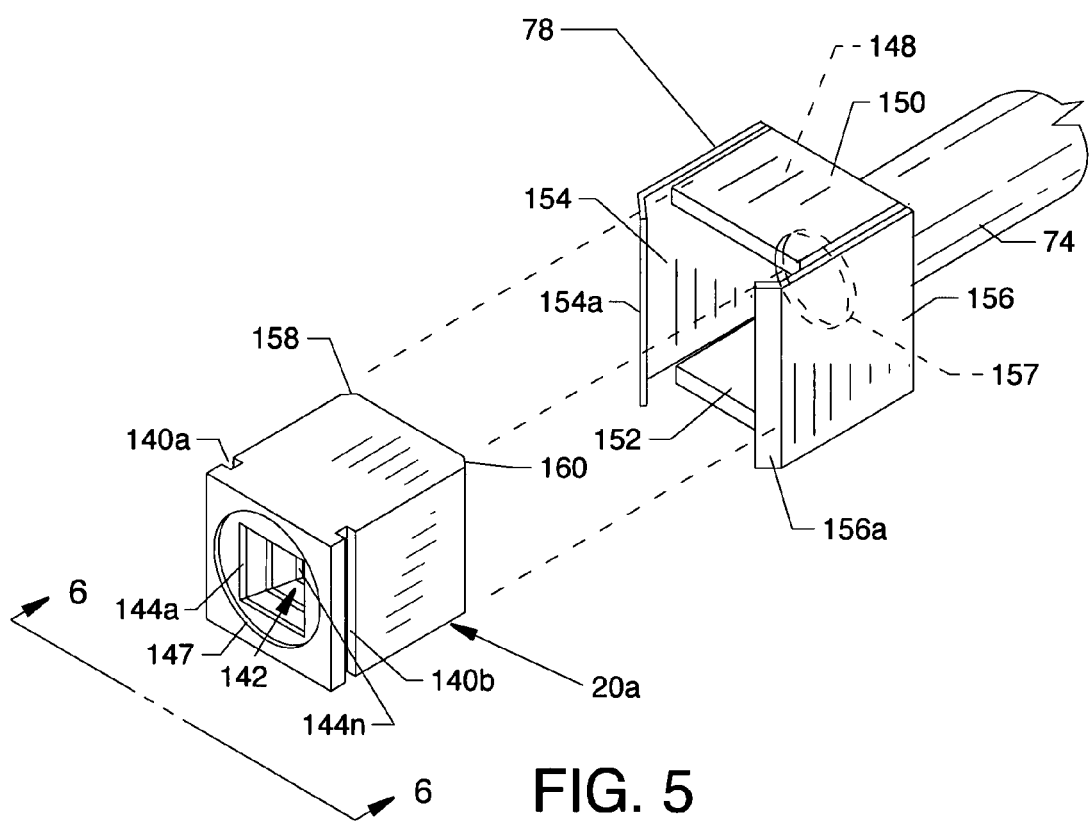
FIG. 5 is an isometric view of one of the replacement valve nuts in spaced alignment with a nut receptacle socket at one end of the valve nut replacement tool.
Figure 6:
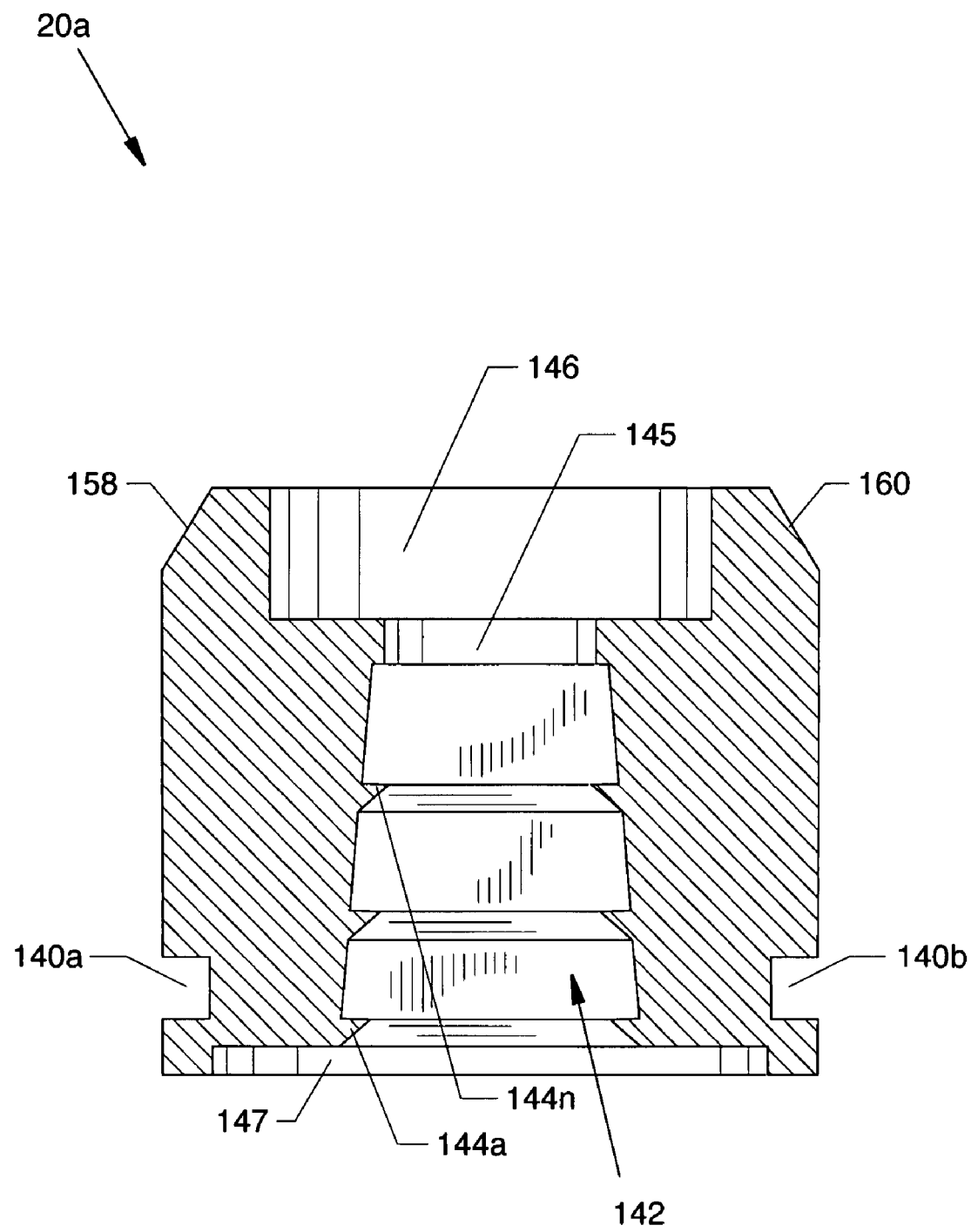
FIG. 6 is a cross section view of the replacement valve nut along line 6-6 of FIG. 5.
Figure 7:
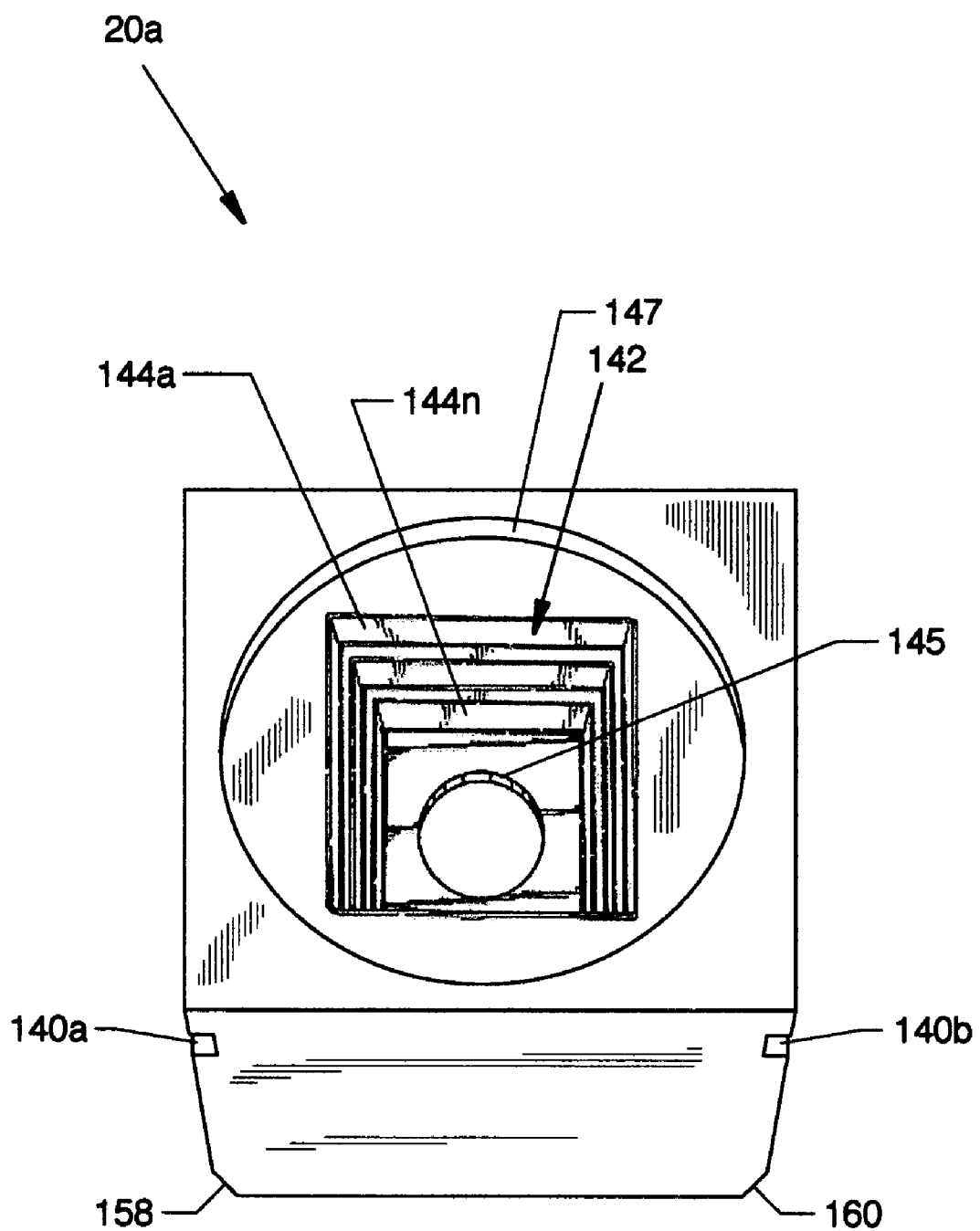
FIG. 7 is a bottom view of the replacement valve nut.

FIG. 5 is an isometric view of one of the replacement valve nuts 20a in spaced alignment with the nut receptacle socket 78 at one end of the valve nut replacement tool 18, FIG. 6 is a cross section view of the replacement valve nut 20a along line 6-6 of FIG. 5, and FIG. 7 is a bottom view of the replacement valve nut 20a. The nut receptacle socket 78 (FIG. 5) is used to grasp and to place the universal replacement nut 20a or other nuts, such as, but not limited to, the valve nuts 20a-20n on the stem of various valves, such as later described in detail. Each of the replacement valve nuts 20a-20n has externally located opposed grooves 140a and 140b in close proximity to its bottom and a centrally located valve stem receptacle 142 in the general shape of a truncated pyramid including a plurality of successively smaller angled gripping surfaces 144a-144n on the walls of the valve stem receptacle 142 which leads to a circular opening 145 and a top recess 146. The replacement valve nut 20a also has a bottom recess 147 in axial alignment with the valve stem receptacle 142. The top recess 146 accommodates the head of a retainer bolt or a retainer nut used to fasten a replacement valve nut 20a-20n to a valve stem and the circular opening 145 accommodates either a valve stem or the threaded portion of a retainer bolt. The nut receptacle socket 78 includes a robust end plate 148, opposed side plates 150 and 152 connected to and extending from the end plate 148, and opposed flexible side plates 154 and 156, whereby each side plate 150, 152, 154 and 156 is common to and extends perpendicularly from the end plate 148. A passage hole 157 is included in the end plate 148 which aligns with and communicates with the interior of the tube 74. The passage hole 157 can accommodate the upper portion of a valve stem, if required. The end plate 148 is suitably attached, such as by a weldment, to the tube 74 of the valve nut replacement tool 18. The flexible side plates 154 and 156 include inwardly extending angled tabs 154a and 156a, respectively, which forcibly engage grooves 140a and 140b of the replacement valve nut 20a in order to facilitate capture of any such nut within the interior of the nut receptacle socket 78. Accordingly, the replacement valve nut 20a includes beveled edges 158 and 160 which facilitate the flexing of the angled tabs 154a and 156a outwardly when the replacement valve nut 20a is forcibly loaded into the nut receptacle socket 78. The replacement valve nut 20a is seated fully into the nut receptacle socket 78 when the angled tabs 154a and 156a are forcibly and intimately engaged in the grooves 140a and 140b in order to retain the replacement valve nut 20a within the nut receptacle socket 78 for placement on a valve stem, as later described in detail. Preferably, the top of the replacement valve nut 20a or other such nut intimately contacts the end plate 148 of the nut receptacle socket 78. A mallet, a hammer, or other suitable and substantial striking device is used to strike the striking surface 76 of the valve nut replacement tool 18 containing the replacement valve nut 20a to forcibly engage the replacement valve nut 20a with a valve stem. Subsequent to placement on a valve stem, the angled tabs 154a and 156a can be forcibly disengaged from intimate contact with the grooves 140a and 140b, whereby the nut receptacle socket 78 is then freed from engagement with the replacement valve nut 20*a* which frictionally engages the valve stem.

MODE OF OPERATION

FIGS. 8-17 illustrate the various modes of operation of the present invention.

FIGS. 8-17 are cross section views illustrating various situations involving the relationship of various components of the invention to a valve 162 having a valve stem 164 and including the damaged valve nut 80 of questionable integrity which could be worn, deformed, corroded or otherwise unsuitable for general use, including nut flats which have been rounded or deformed to the point of unuseability. The nut in question can be removed and replaced with another nut which could be an identical nut or which could be one of the replacement valve nuts, such as 20*a*, for example and illustration. A retainer nut 168 engages threads 170 at the top of the valve stem 164 in order to maintain suitable intimate engagement of the interior flatted and tapered surfaces (a truncated pyramid shape) of the damaged valve nut 80 with the corresponding and similar complementary shape of the valve stem 164. The valve 162 is shown at the bottom of a valve box 172 extending downwardly to a location in the earth 174 distant from the surface of the earth.

FIG. 8 illustrates the cleaning process incorporating components of the invention to clean the area around and about the retainer nut 168 using the accessory tool shaft 14, the tool receptor 48, and the rotary brush 60. To accomplish the cleaning process, the pivot bolts 126 and 128 are removed to allow removal of the levered arms 38 and 40 from the end structure 26. The threaded actuator shaft 30 is rotated to disengage from the cam 32, thereby allowing removal of both from the end structure 26, thus creating room in the end structure 26 for accommodating the accessory tool shaft 14 and rotary brush 60, the latter of which is attached to the lower end of the accessory tool shaft 14 through use of the tool receptor 48. Preferably, the hex head 46 of the accessory tool shaft 14 is bottom loaded through the lower and open end of the housing 42, along and through the arcuate accommodation space 96, the tool accommodation cavity 94, the bottom shouldered bushing 86, the collar 88, the interior of the elongated tube 24, and the top shouldered bushing 34. In the alternative, the accessory tool shaft 14 only can be top loaded in the reverse order of that just described and the tool receptor 48 and rotary brush 60 can be attached to the square drive connector 47 by use of the pin 51 and the set screws 54, respectively. Thus, the accessory tool shaft 14 is aligned within and guided by the top shouldered bushing 34 and the bottom shouldered bushing 86, whereby the remaining associated components of the end structure 26, the tube 24, and the accessory tool shaft 14, and closely associated components are lowered down through the valve box 172 to engage the damaged valve nut 80. The valve nut receptor cavity 98 at the bottom of the end structure 26 assists in the alignment over and about a portion of the damaged valve nut 80, thereby centering and aligning the rotary brush 60 over and about the retainer nut 168. A powered device, such as an electric drill, or the removably attachable tool handle 16 or other hand operated device, can then be attached to the hex head 46 of the accessory tool shaft 14 to rotate the accessory tool shaft 14 and attached rotary brush 60 to clean the threads 170 of the valve stem 164 and the retainer nut 168 and the area around and about the retainer nut 168 in order to facilitate the use of the accessory tool shaft 14 and nut socket tool 65. Manual rotation of the accessory tool shaft 14 and attached rotary brush 60 without any mechanical advantage device can also be used if desired. The same insertion methods can be used to load and to use other components associated with the accessory tool shaft 14, such as, but not limited to, use of the thread cleaner die 56, the rotary brush 58, the tap drill 62, or the tap 64.

FIG. 9 illustrates the use of the accessory tool shaft 14 and the nut socket tool 65 to remove the retainer nut 168 from the valve stem 164 in order to allow subsequent removal of a damaged valve nut 80. If the cleaning procedure has been accomplished, and the rotary brush 60 or other attachment is then removed from the end structure 26. If the retainer nut 168 does not require cleaning, as in the procedure described in FIG. 8, use of the rotary brush 60 is not required, whereby the end structure 26 can be configured for affixing the nut socket tool 65 to the accessory tool shaft 14. Such configuration requires removal of the pivot bolts 126 and 128 in order to remove the levered arms 38 and 40 from the end structure 26 subsequent to which the threaded actuator shaft 30 is rotated to disengage from the cam 32, thus allowing removal of the threaded actuator shaft 30 and the cam 32 from the end structure 26 in order to create room in the end structure 26 for accommodating the accessory tool shaft 14 and the nut socket tool 65. Top loading of the accessory tool shaft 14 can be initiated by inserting the end of the accessory tool shaft 14 with its square drive connector 47 through the top shouldered bushing 34, the interior of the tube 24, the collar 88, the bottom shouldered bushing 86, the tool accommodation cavity 94, along and through the arcuate accommodation space 96, and thence through the lower and open end of the housing 42 where the square drive connector 47 can suitably engage and be secured to the nut socket tool 65 by use of the pin 66. In the alternative, the accessory tool shaft 14 can be bottom loaded in reverse order through the components previously described, whereby the hex head 46 of the accessory tool shaft 14 is inserted first through the lower region of the remaining components of the end structure 26. With this method, the nut socket tool 65 can be secured to the square drive connector 47 before or after bottom loading. In either loading method, the accessory tool shaft 14 is aligned within and guided by the top shouldered bushing 34 and the bottom shouldered bushing 86, whereby the remaining components of the end structure 26, the tube 24, the accessory tool shaft 14, and nut socket tool 65, and closely associated components, are lowered unitarily through the valve box 172 to engage the retainer nut 168. The valve nut receptor cavity 98 at the bottom of the fixture 26 assistingly aligns over and about a portion of the damaged valve nut 80, thereby centering and aligning the nut socket tool 65 over and about the retainer nut 168 for mutual engagement. The accessory tool shaft 14 can then be rotated, such as by the use of an electric drill, or the removably attachable T-handle 16 in engagement with the hex head 46 of the accessory tool shaft 14 to cause disengagement of the retainer nut 168 from the threads 170 of the valve stem 164, whereby the retainer nut 168 is removed therefrom. After removal of the retainer nut 168 from the valve stem 164, the end structure 26, the accessory tool shaft 14, and nut socket tool 65, the tube 24 and closely associated components are unitarily removed from the valve box 172 pending removal of the damaged valve nut 80 or other nut. The retainer nut 168 is then removed from the valve box 172.

Figure 10:
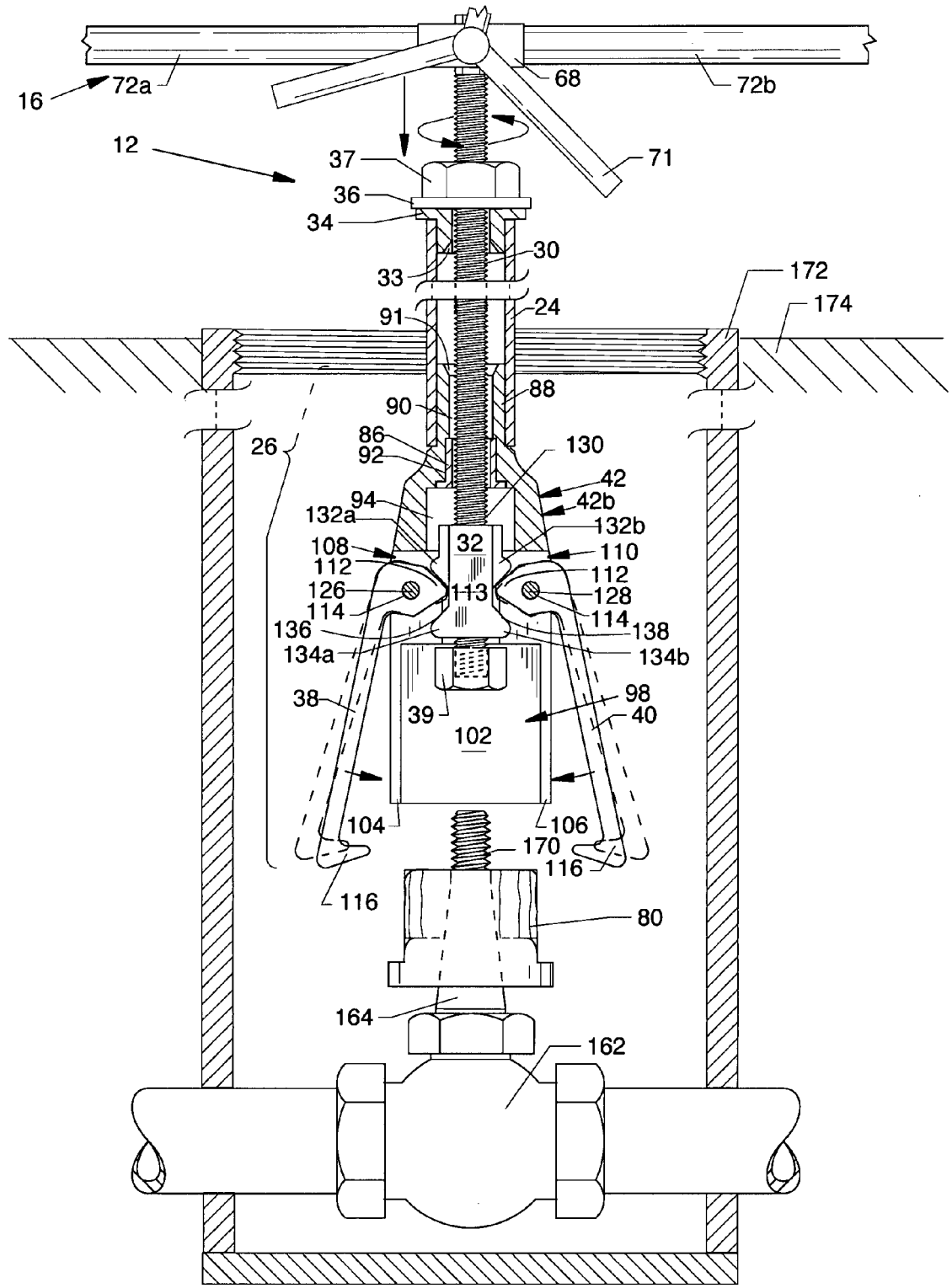
FIG. 10 illustrates the insertion of a fully assembled valve nut puller tool into a valve box for the purpose of the subsequent engagement with and removal of a damaged valve nut.

FIG. 10 illustrates the insertion of the fully assembled valve nut puller tool 12 into the valve box 172 for the purpose of subsequent engagement with and removal of a nut, such as, but not limited to, the damaged valve nut 80. Prior to such insertion, the valve nut puller tool 12 is preconfigured to pivotally position the jaws 116 of the levered arms 38 and 40. For purposes of example and illustration, if the tube 24 of the valve nut puller tool 12 were to be held constant in space without any other support, the weight of the threaded actuator shaft 30 would cause downward gravitational positioning of the threaded actuator shaft 30 and the cam 32, whereby the opposed top lobes 132a and 132b would come into intimate contact with the follower cams 112 of the levered arms 38 and 40, thereby causing the outward positioning of the levered arms 38 and 40 about the pivot bolts 126 and 128, respectively, whereby the levered arms 38 and 40 are extended in an outward direction, such as represented by the position of the levered arms 38 and 40 shown in dashed lines. Such extension may be incompatible with the size of the valve box 172 and, as such, the degree of extension may be controlled by adjustably rotating the nut 37 downwardly along the threaded actuator shaft 30 and against the washer 36 and the top of the tube 24, thereby raising the threaded actuator shaft 30 and the cam 32, whereby the opposed top lobes 132a and 132b of the cam 32 with the aid of gravity are repositioned during intimate contact with the follower cams 112 to adjust the levered arms 38 and 40 inwardly, with gravitational assistance, to a lesser extended mid-position at a desired angle, as shown in FIG. 10, suitable for descent into the valve box 172. Such an adjustable configuration provides for angular control of the levered arms 38 and 40 and jaws 116. The valve nut puller tool 12 in this configuration is preferably grasped by the tube 24 and lowered unitarily into the valve box 172 to insert the damaged valve nut 80 into the valve nut receptor cavity 98 until the interface/thread protector 39, which is firmly engaged and threadingly engaged over and about the lower end of the threaded actuator shaft 30, intimately contacts the top of the valve stem 164. The threads 170 of the valve stem 164 and the threads of the threaded actuator shaft 30 are protected by using the interface/thread protector 39, as well as providing an interface between such threaded components.

Figure 11:
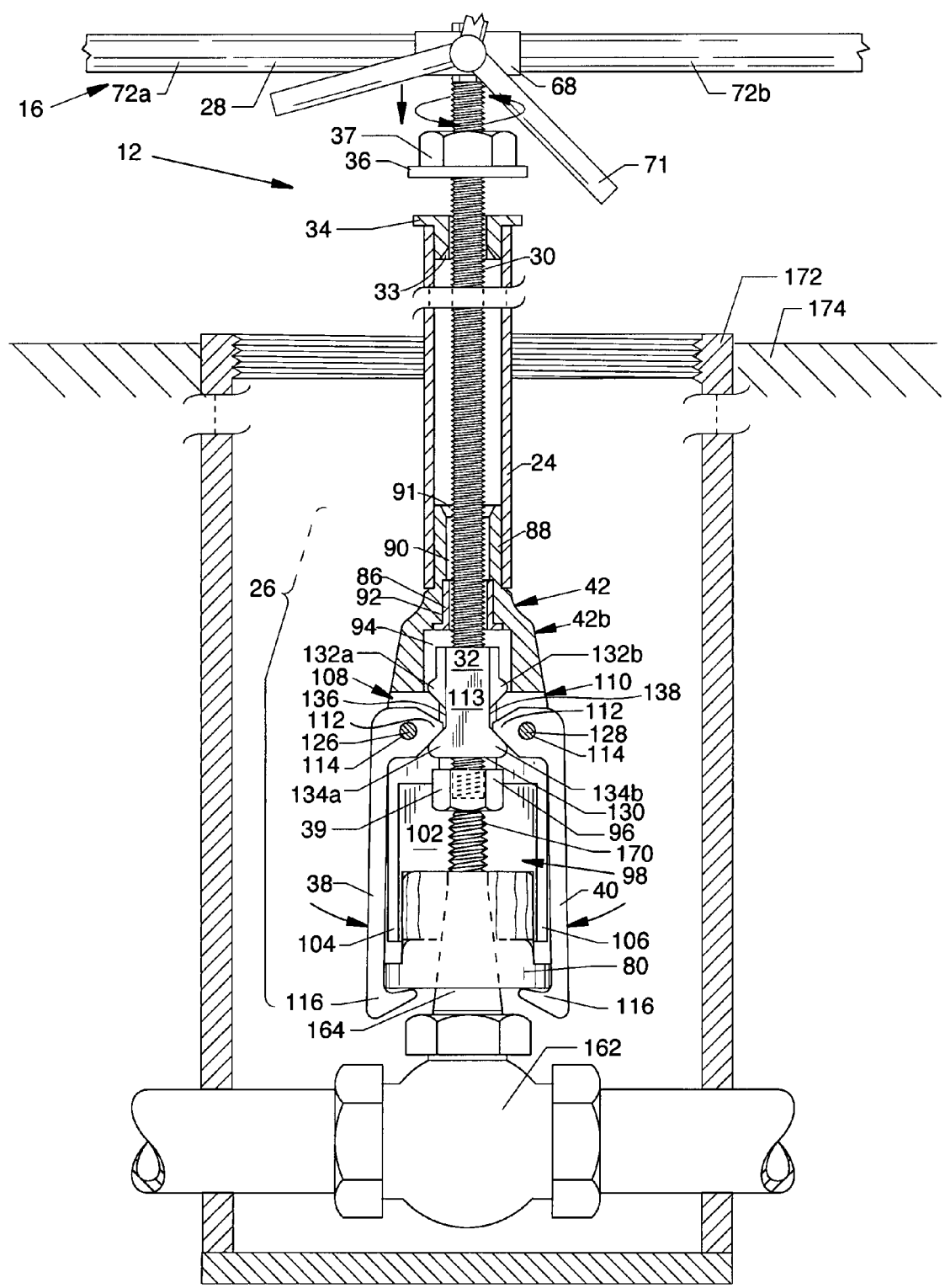
FIG. 11 illustrates the capture of a damaged valve nut within a nut receptor cavity.

FIG. 11 illustrates the capture of the damaged valve nut 80 within the valve nut receptor cavity 98. Capture of the damaged valve nut 80 is accomplished by rotation of the threaded actuator shaft 30 within the tube 24 by turning the removably attached T-handle 16. The threaded actuator shaft 30 is actuated moving the cam 32 upwardly along the threaded actuator shaft 30, whereby the follower cams 112 on the levered arms 38 and 40 are disengaged from the top lobes 132a and 132b to transit the non-lobe flat surfaces 136 and 138 without engagement therewith until the bottom lobes 134a and 134b are forcibly engaged by the follower cams 112 of the levered arms 38 and 40, thereby pivoting the levered arms 38 and 40 about the pivot bolts 126 and 128 to cause levered arms 38 and 40 and their jaws 116 to move inwardly. Such action forcibly positions the lower portion of the levered arms 38 and 40 against the damaged valve nut 80 and forces the opposing jaws 116 of the levered arms 38 and 40 to a fixed and locked position beneath the opposed lower edges of the damaged valve nut 80, thus fixing and locking the position and relationship of the levered arms 38 and 40 with respect to the bottom lobes 134a and 134b of the cam 32 and to the cam 32 into a unitary structure the geometry of which is virtually unalterable. Further rotation of the threaded actuator shaft 30 is continued, whereby the threaded actuator shaft 30 and interface/thread protector 39 increasingly bear against the top of the valve stem 164 to cause the positionally fixed opposed levered arms 38 and 40, in fixed combination with the cam 32, to move unitarily and transfer an upwardly directed force between the jaws 116 of the opposed levered arms 38 and 40 and the top of the valve stem 164 to forcibly remove the damaged valve nut 80 from the valve stem 164. Once the damaged valve nut has been separated, the nut 37 can be adjusted downwardly to bear against the washer 36 and the top shouldered bushing 34, thereby fixing the position of the threaded actuator shaft 30 in relationship to the unitarily fixed and combined cam 32, levered arms 38 and 40, and damaged valve nut 80. Then, the valve nut puller tool 12 is removed from the valve box 172 by grasping the tube 24 or the removably attached handle 16. Upward movement of the cam 32 in the housing 42 is accommodated by the tool accommodation cavity 94. During any positioning of the cam 32, the opposed levered arms 38 and 40 and the jaws 116 are accommodated by the opposed slots 108 and 110, respectively.

Figure 12:
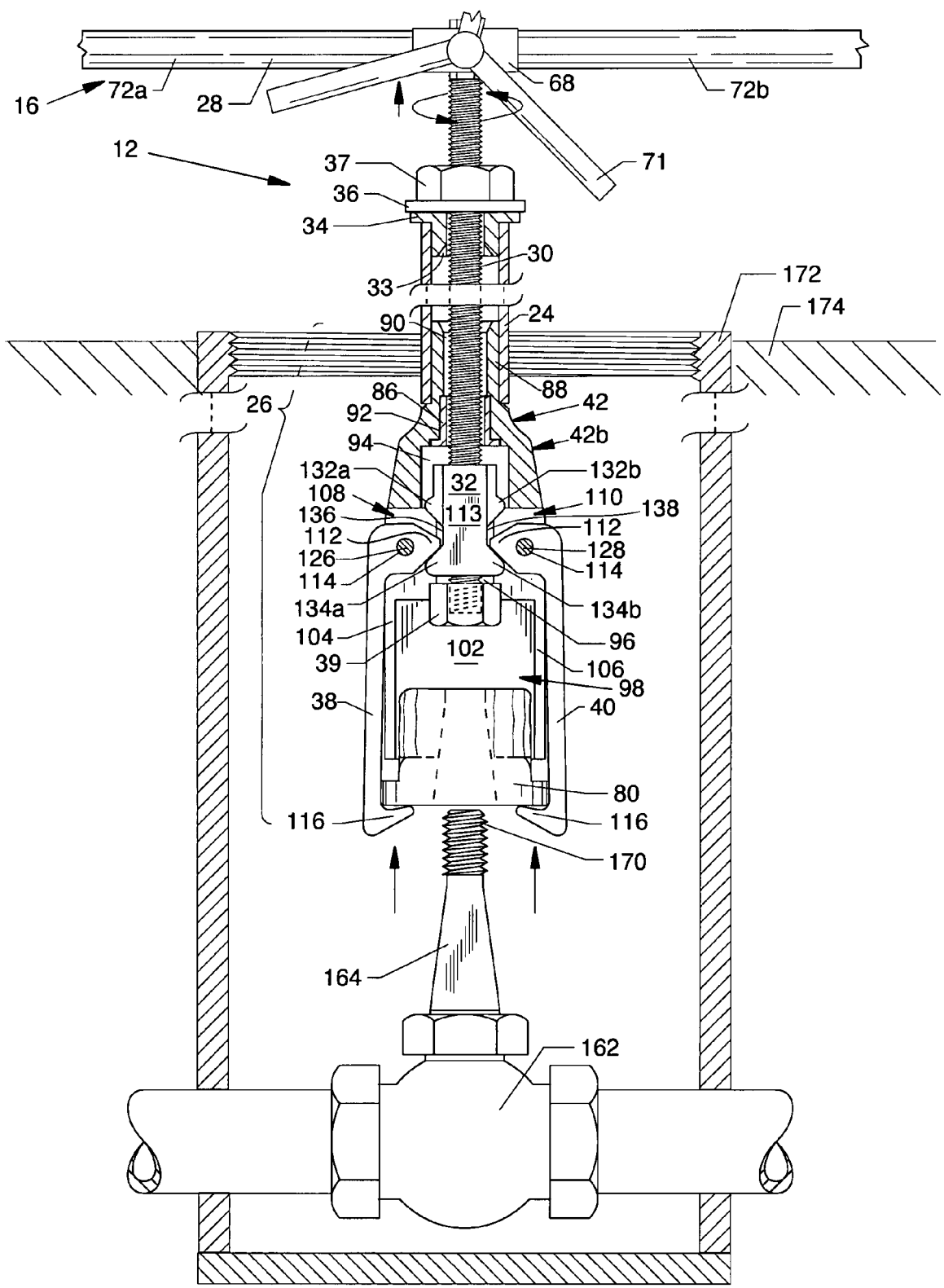
FIG. 12 illustrates the unitary removal of the valve nut puller tool, the damaged valve nut and other closely associated components from a valve box where the damaged valve nut has been disengaged from the valve stem of a valve.
Figure 16:
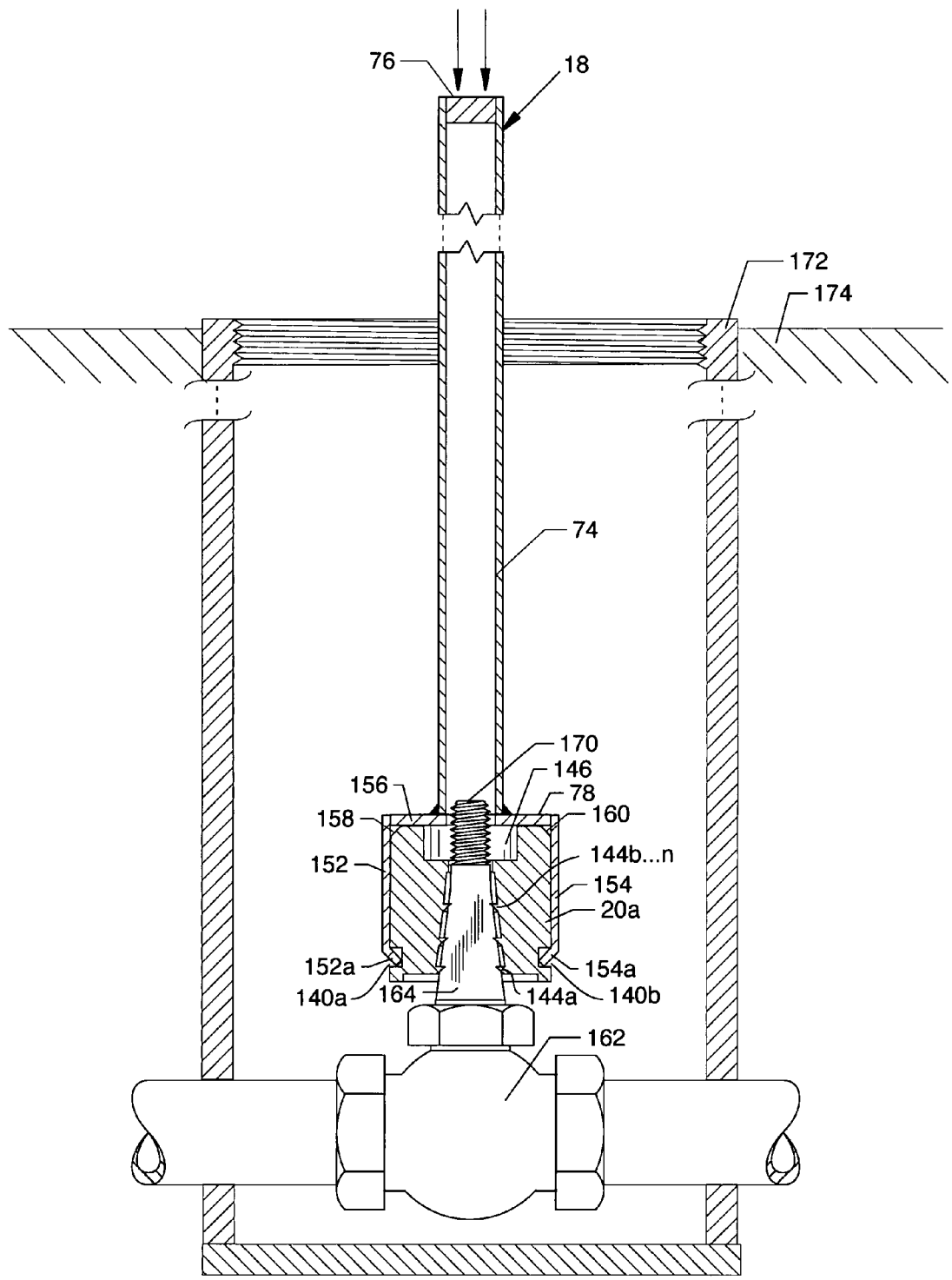
FIG. 16 illustrates the replacement of a valve nut on a valve stem utilizing the valve nut replacement tool.

FIG. 12 illustrates the unitary removal of the valve nut puller tool 12, the damaged valve nut 80 and other closely associated components from the valve box 172 where the damaged valve nut 80 has been disengaged from the valve stem 164 of the valve 162 and where the damaged valve nut 80 is now firmly affixed within the end structure 26. Replacement of the damaged valve nut 80 by a suitable replacement valve nut, such as one of the replacement valve nuts 20a-20n, is typified by the replacement valve nut 20a from the valve nut supply plate 19 (FIG. 1) and which can now be accomplished by use of the valve nut replacement tool 18, as illustrated in FIG. 16. The numbered stems 23a-23n of the stem matching plate 22 can be used to determine and select a nut 20a-20n of an appropriate internal size and/or shape as correspondingly provided on the valve nut supply plate 19.

Figure 13:
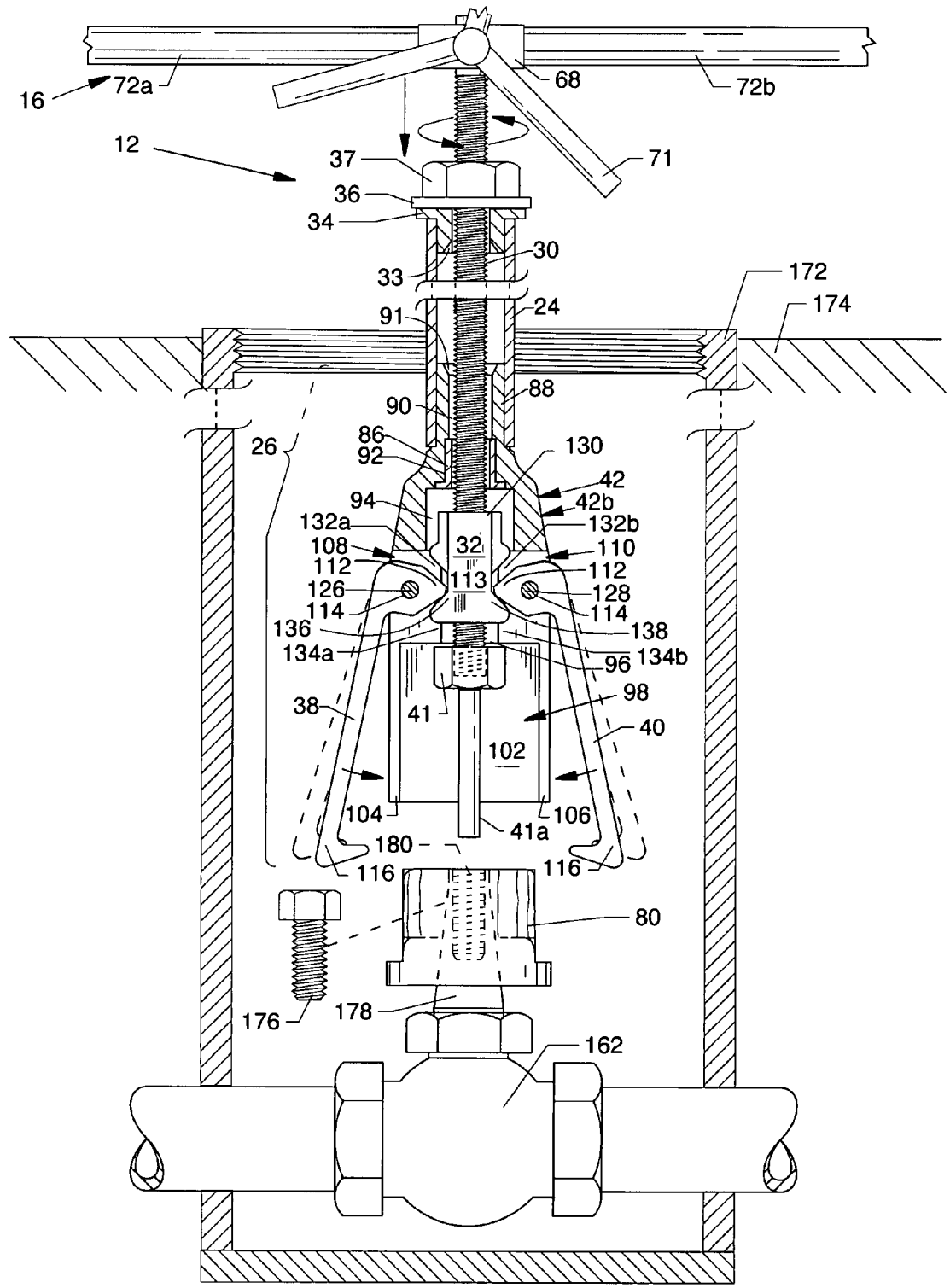
FIG. 13 illustrates the use of the extended interface/thread protector and valve nut puller tool to remove a damaged valve nut from a valve stem having an internally threaded hole where the fully assembled valve nut puller tool is inserted into the valve box.

FIG. 13 illustrates the use of the extended interface/thread protector 41 during the removal of a damaged valve nut 80 from a different valve stem 178 having an internally threaded hole 180 where the fully assembled valve nut puller tool 12 is inserted into the valve box 172 for the purpose of the subsequent engagement with and removal of a nut, such as, but not limited to, a damaged valve nut 80. In FIG. 13, the mode of operation is similar to that described with respect to FIG. 10. In this illustration, the extended interface/thread protector 41 has replaced the interface/thread protector 39 of FIG. 10. A retainer bolt 176 is shown (for the purpose of illustration), which bolt has previously been removed from the valve stem 178 where such valve stem 178 has an internally threaded hole 180, by the same method described with respect to FIG. 9 for removal of the retainer nut 168. The internally located threads of the extended interface/thread protector 41 threadably engage the threads at the bottom end of the threaded actuator shaft 30. Protection is thus afforded to the internally threaded hole 180 of the valve stem 178 and to the threads of the threaded actuator shaft 30 by the use of the extended interface/thread protector 41, as well as providing an interface between such threaded components.

Figure 14:
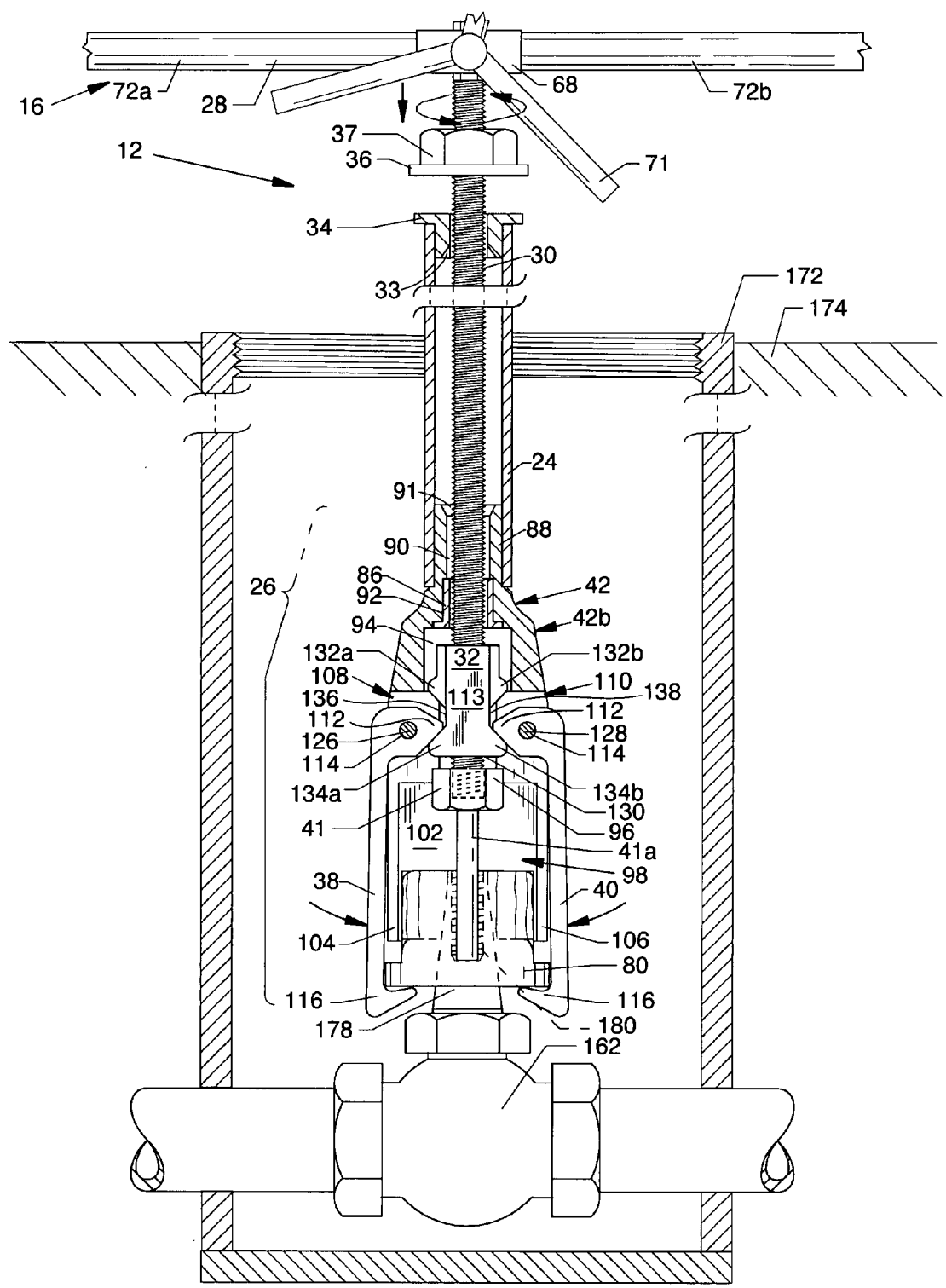
FIG. 14 illustrates the capture of the damaged valve nut within the valve nut receptor cavity.

FIG. 14 illustrates the capture of the damaged valve nut 80 within the valve nut receptor cavity 98. In FIG. 14, the mode of operation is substantially the same as that described with respect to FIG. 11. The extended interface/thread protector 41 is shown extending into the internally threaded hole 180 of the valve stem 178 for the purpose of providing a forcible contact with the valve stem 178 at the bottom of the internally threaded hole 180. The same forcible relationship exists between the cam 32, the extended interface/thread protector 41, the levered arms 38 and 40, jaws 116, the valve stem 178, and the damaged valve nut 80, as previously described with respect to FIG. 11.

Figure 15:
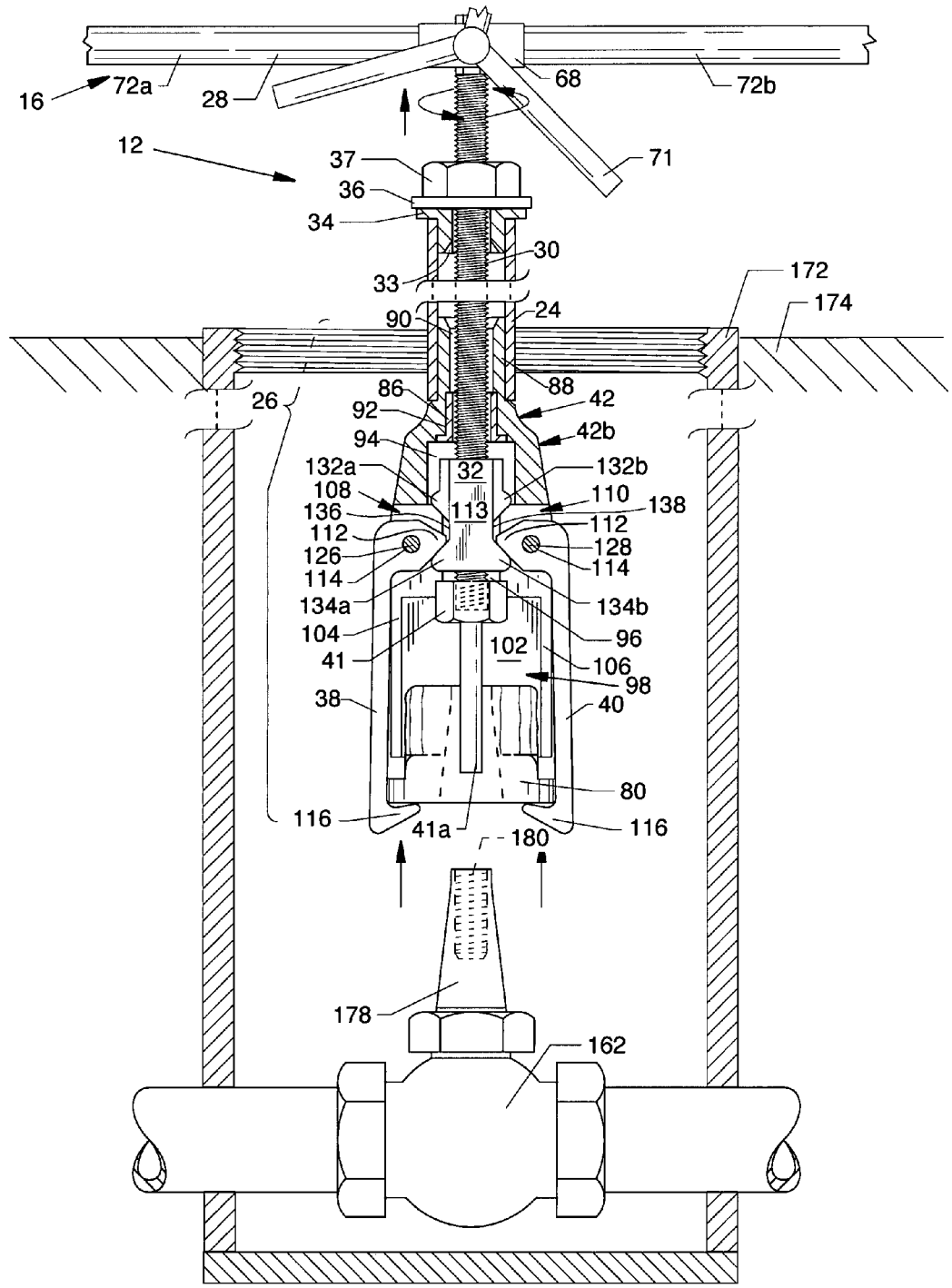
FIG. 15 illustrates the unitary removal of the valve nut puller tool, the damaged valve nut and other closely associated components from the valve box where the damaged valve nut has been disengaged from the valve stem.

FIG. 15 illustrates the unitary removal of the valve nut puller tool 12, the damaged valve nut 80, and other closely associated components from the valve box 172 where the damaged valve nut 80 has been disengaged from the valve stem 178 of the valve 162. In FIG. 15, the mode of operation is substantially the same as that described with respect to FIG. 12, illustrating the unitary removal of the valve nut puller tool 12, the damaged valve nut 80, and other closely associated components from the valve box 172 where the damaged valve nut 80 has been disengaged from the valve stem 178 of the valve 162.

FIG. 16 illustrates the replacement of a nut, such as the replacement valve nut 20*a* or other suitable nut, such as may be required on the valve stem 164 of the valve 162 shown herein. The same method is used to install a replacement valve nut 20*a* on the alternative valve stem 178 of the valve 162 (shown in FIG. 14). With reference to FIG. 5 and FIG. 16, the process for replacement is now described. The replacement valve nut 20*a* is loaded into the nut receptacle socket 78, whereby the flexible side plates 154 and 156 and the angled tabs 154*a* and 156*a* are flexibly urged outwardly by forcible contact with the beveled edges 158 and 160 of the replacement valve nut 20*a*, whereupon the replacement valve nut 20*a* is subsequently and forcibly maneuvered into the confines of the nut receptacle socket 78 until the angled tabs 154*a* and 156*a* springingly engage the grooves 140*a* and 140*b*, respectively, on the exterior surfaces of the replacement valve nut 20*a*. The valve nut replacement tool 18, including the replacement valve nut 20*a*, is lowered into the valve box 172 to align the valve stem receptacle 142 of the replacement valve nut 20*a* over and about the valve stem 164 and to place the replacement valve nut 20*a* on the valve stem 164. Upon such suitable alignment and placement, the remotely located striking surface 76 of the tube 74 can be suitably struck by a mallet or hammer to impart a downwardly directed force on the tube 74 to the nut receptacle socket 78, whereby such force is further transmitted to the replacement valve nut 20*a*, thereby causing suitable frictional engagement of the inner gripping surfaces 144*a*-144*n* of the replacement valve nut 20*a* with the angled planar sides of the valve stem 164. Upon such suitable frictional engagement, as just described, the valve nut replacement tool 18 is pulled upwardly to cause flexible disengagement of the angled tabs 152*a* and 154*a* from the grooves 140*a* and 140*b*, and thus from the replacement valve nut 20*a* which is now frictionally engaged upon the valve stem 164. The valve nut replacement tool 18 is withdrawn from the valve box 172 and a new retainer nut 168 (FIG. 17) is made to engage the threads 170 of the valve stem 164 and to engage the top of the replacement valve nut 20*a* by the combined use of the accessory tool shaft 14 and nut socket tool 65 with the appropriately configured end structure 26 and associated components in use with the tube 24 which provides for suitable alignment in a manner mostly similar to that as previously described for removal of a retainer nut 168 such as shown in FIG. 9.

Figure 17:
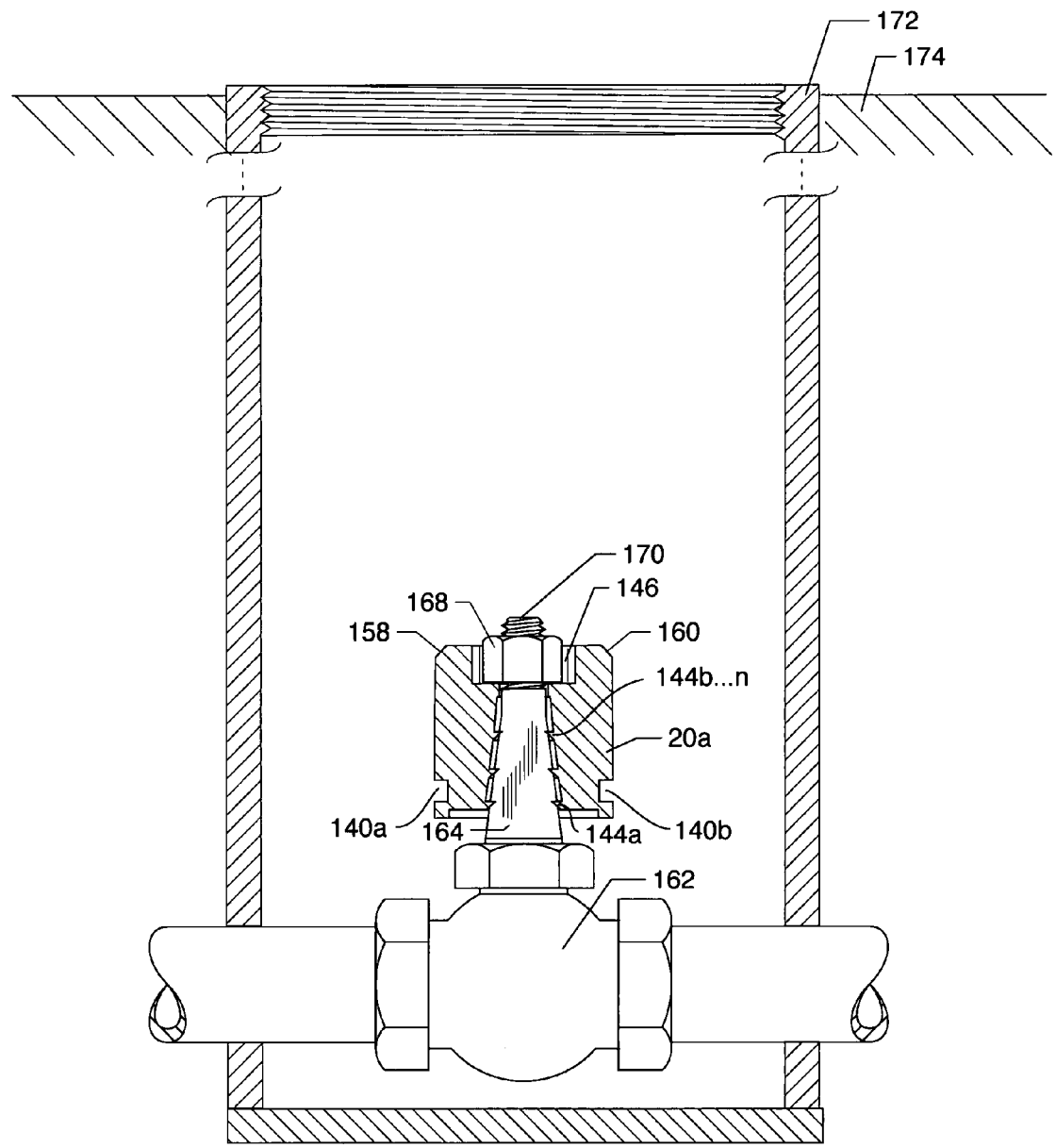
FIG. 17 shows a replacement valve nut installed on and secured upon a valve stem by a new retainer nut in engagement with the threads of the valve stem; and, FIG. 18 shows a shortened valve nut puller tool, an alternative embodiment.

FIG. 17 shows a replacement valve nut 20*a* installed on and secured upon the valve stem 164 by a new retainer nut 168 in engagement with the threads 170 of the valve stem 164. The retainer nut 168 is located in and maintains a low profile within the top recess 146 of the replacement valve nut 20*a*. A new retainer bolt 176 can also be installed (in a manner similar to that described for installation of the new retainer nut 168) to engage and maintain a low bolt head profile within the top recess 146, whilst engaging the internally threaded hole 180 of the alternative valve stem 178 shown in FIG. 13.

Figure 18:
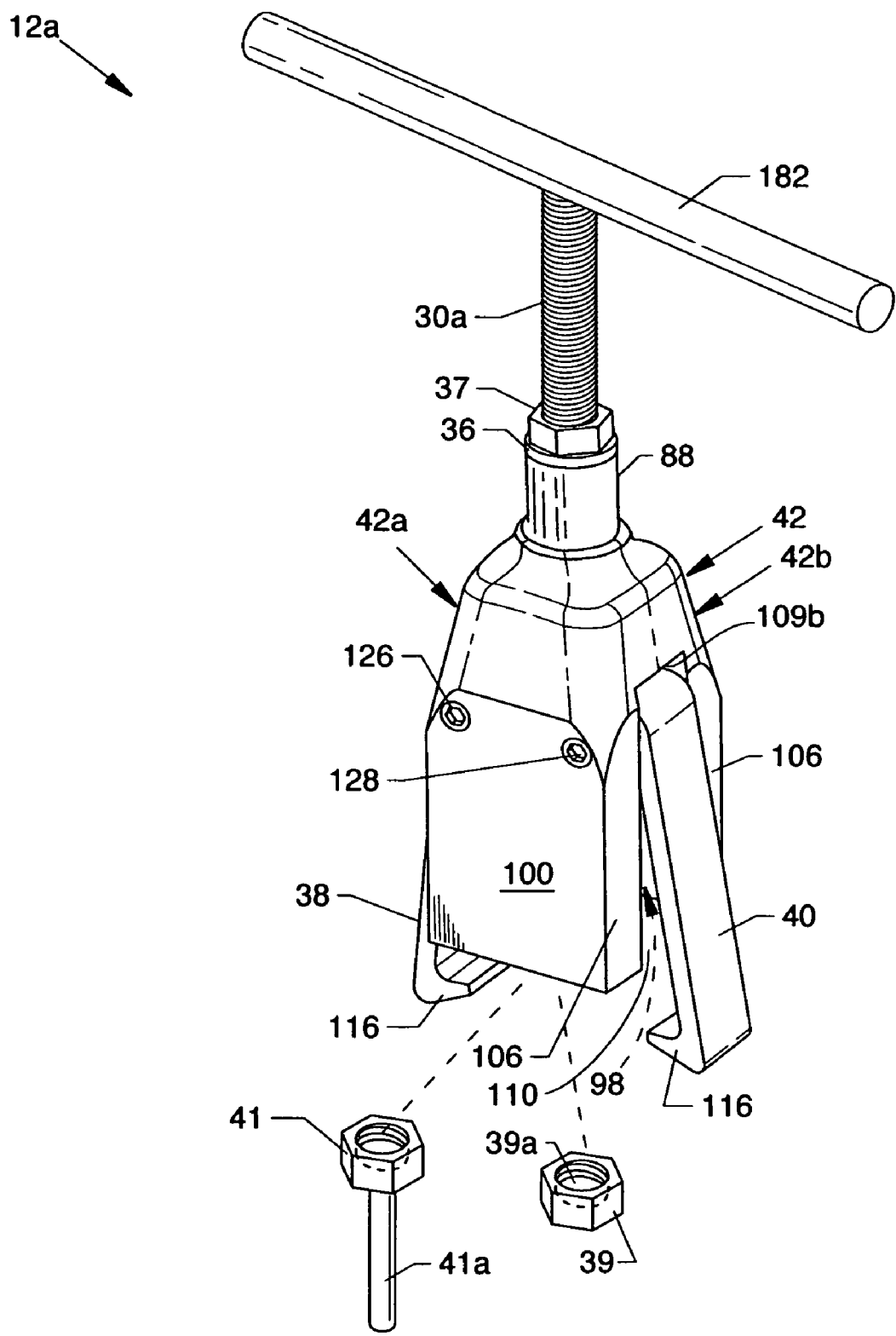

FIG. 18 shows an alternative embodiment of a valve nut puller tool 12*a* of the present invention. It can be appreciated that the valve nut removal and replacement system 10 may be used to remove a damaged valve nut 80 at a location lying well beneath the surface of the earth or at street level. However, other conditions may exist where an excavation is made where a valve having a damaged valve nut is totally unearthed, whereby personnel have close and direct access at the same level as the damaged valve nut. In such a scenario, use of the valve nut removal and replacement system 10, such as shown in FIG. 1, is possible, but difficult, due to the complexity of support of personnel in accessing the upwardly located top regions of the invention. Conceivably, personnel could stand on a ladder to use the invention, but a more practical approach is to provide a valve nut puller tool 12*a*, which is a shortened and slightly modified version of the valve nut puller tool 12 and which can be used at the same level as the damaged valve nut. The main differences are the exclusion of the tube 24 and the removably attached T-handle 16 and the permanent addition of a T-handle 182 to a shortened threaded actuator shaft 30*a*. However, for compactness and other considerations, such as bulkiness, ease of packaging, shipping and the like, the valve nut puller 12*a* could be furnished for use with the removably attachable T-handle 16, whereby a hex head, such as hex head 28, would be located at the top of the threaded actuator shaft 30*a* in lieu of the T-handle 182. The teachings of and the operation of the valve nut puller tool 12*a* are similar to that described for the operation of the valve nut puller tool 12. The accessory tool shaft 14 and the valve nut replacement tool 18 could also be shortened for use as previously described.

Various modifications can be made to the present invention without departing from the apparent scope thereof.

It is claimed:

1. A tool for removing a damaged valve nut from a valve in an underground location comprising an elongated tube with a threaded rotatable shaft extending therethrough, said threaded shaft extending externally from one end of said elongated tube, a rotatable handle connected to said externally extended threaded shaft, an end structure fixedly connected to said threaded shaft at the opposite end of said shaft and said elongated tube, said end structure including a housing having an upper portion with a tool accommodation cavity and a lower portion with spaced opposing side walls forming a cavity therebetween for receiving a damaged valve nut, and a pair of spaced pivotable arms adjacent and operatively connected to said housing and passing between said side walls and into said cavity, each of said pivotable arms having a follower cam, a cam connected to said threaded shaft mainly within said upper portion of said housing and in cooperative engagement with said follower cams, said cam further being axially movable by rotation of said threaded shaft and wherein said pivotable arms being attached to said housing so as to move towards and away from each other by the axial movement of said cam thereby grasping said damaged valve nut and removing the nut from its underground location.

2. The tool of claim 1, wherein each of said pivotable arms has an inwardly extending jaw at a bottom end thereof.

3. The tool of claim 1, wherein each of said pivotable arms is pivotable around a bolt passing through the top end of said arm, said bolt being attached to said housing.

4. The tool of claim 1, wherein said spaced opposing side walls are separated by a pair of slots therebetween for allowing passage of each said pivotable arms within each of said slots, respectively.

5. The tool of claim 1, wherein said cam is connected to said threaded shaft by means of an internally threaded bore.

6. A tool kit for cleaning, repairing, replacing or maintaining a damaged valve nut, a valve nut stem, or retainer nut in an underground location for a valve, said tool kit comprising an elongated tube, an accessory tool shaft adapted to extend therethrough and rotate therein, said accessory tool shaft extending externally from one end of said elongated tube, a handle attached to said accessory tool shaft at said end extending externally from said one end, said handle actuating the rotation of said accessory tool shaft within said elongated shaft, and at least a first means selectively rotatably attached to the opposite end of said accessory tool shaft and extending externally of said elongated tube, said at least first means including a housing having an upper portion with a tool accommodation cavity and a lower portion with spaced opposing side walls forming a cavity therebetween for receiving a damaged valve nut, a valve nut stem or a retainer nut and a pair of spaced pivotable arms adjacent and operatively connected to said housing and passing between said side walls and into said cavity, each of said pivotable arms having a follower cam, a cam connected to said threaded shaft mainly within said upper portion of said housing and in cooperative engagement with said follower cams, said cam further being axially movable by rotation of said threaded shaft and wherein said pivotable arms being attached to said housing so as to move towards and away from each other by the axial movement of said cam for cleaning, repairing, replacing or maintaining said damaged valve nut, said valve nut stem or said retainer nut.

7. The tool kit of claim 6, wherein said kit further includes a tool receptor for selective attachment to said opposite end of said accessory tool shaft, at least a second means is selectively attached to a tool receptor for receiving various cleaning tools or repair tools.

8. The tool kit of claim 7, wherein at least a third means is a rotary cleaning brush with internal bristles.

9. The tool kit of claim 7, wherein at least a fourth means is a rotary cleaning brush with external bristles.

10. The tool kit of claim 7, wherein at least a fifth means is a cylindrical thread cleaner.

11. The tool kit of claim 7, wherein at least a sixth means is a tap or tap drill.

12. The tool kit of claim 7, wherein said accessory tool shaft further includes a square drive connector at said opposite end thereof.

13. The tool kit of claim 12, wherein said tool receptor is removably attached to said square drive connector.

14. The tool kit of claim 6, wherein at least a seventh means is a nut socket tool for removing a retainer nut from the stem of said underground valve.

15. The tool kit of claim 14, wherein said accessory tool shaft has a square drive connector at said opposite end thereof.

16. The tool kit of claim 15, wherein said nut socket tool is removably attached to said square drive connector.

17. The tool kit of claim 6, wherein said accessory tool shaft has a hexagonal head at one end thereof.

18. The tool kit of claim 17, wherein said handle is removably attached to said hexagonal head.

19. The tool kit of claim 6, further comprising at least an eighth means, said eighth means includes a plug of high strength material closing one end of said elongated tube, said plug and said end of said elongated tube forming a striking surface for a percussion tool, a nut receptacle socket affixed to the opposite end of said elongated tube, said nut receptacle socket having four planar side plates and a top planar plate attached to said opposite end of said elongated tube, said side plates and said top plate forming a substantially square configuration and an internal space for receiving a replacement valve nut, two of said side plates being spaced opposite each other, each of said two opposing side plates being flexible and having an inwardly extending tab for engagement with respective grooves in opposing sides of said replacement valve nut.

* * * * *